United States Patent
Ziraknejad et al.

(10) Patent No.: US 9,876,788 B1
(45) Date of Patent: Jan. 23, 2018

(54) USER ENROLLMENT AND AUTHENTICATION

(71) Applicant: MicroStrategy Incorporated, Vienna, VA (US)

(72) Inventors: Siamak Ziraknejad, Reston, VA (US); Ren-Jay Huang, Leesburg, VA (US); Elaine Li, Arlington, VA (US); Hector Vazquez, Ashburn, VA (US); Peng Xiao, McLean, VA (US)

( * ) Notice: Subject to any disclaimer, the term of this patent is extended or adjusted under 35 U.S.C. 154(b) by 0 days.

(21) Appl. No.: 14/603,682

(22) Filed: Jan. 23, 2015

Related U.S. Application Data

(60) Provisional application No. 61/931,347, filed on Jan. 24, 2014.

(51) Int. Cl.
*G06F 7/04* (2006.01)
*H04L 29/06* (2006.01)

(52) U.S. Cl.
CPC ................ *H04L 63/0861* (2013.01)

(58) Field of Classification Search
CPC .................................................. H04L 63/0861
USPC ............................................................ 726/5
See application file for complete search history.

(56) References Cited

U.S. PATENT DOCUMENTS

| 5,872,848 | A | 2/1999 | Romney et al. |
|---|---|---|---|
| 6,990,588 | B1 | 1/2006 | Yasukura |
| 7,606,560 | B2 | 10/2009 | Labrou et al. |
| 8,189,878 | B2 | 5/2012 | Schultz |
| 8,312,291 | B2 | 11/2012 | Golic et al. |
| 8,370,640 | B2 | 2/2013 | Adams et al. |
| 2003/0163739 | A1 | 8/2003 | Armington et al. |
| 2004/0104266 | A1* | 6/2004 | Bolle .................. G06F 21/6245 235/382 |
| 2004/0249765 | A1* | 12/2004 | Leon ...................... G06F 21/32 705/64 |
| 2006/0010487 | A1 | 1/2006 | Fierer |
| 2008/0209516 | A1 | 8/2008 | Nassiri |
| 2008/0307515 | A1 | 12/2008 | Drokov et al. |
| 2010/0246902 | A1* | 9/2010 | Rowe ................. G06K 9/00033 382/115 |
| 2011/0221568 | A1* | 9/2011 | Giobbi .................. G06F 19/322 340/5.82 |

(Continued)

FOREIGN PATENT DOCUMENTS

| WO | 2000/065770 | 11/2000 |
|---|---|---|
| WO | 2012/167352 | 12/2012 |

(Continued)

OTHER PUBLICATIONS

Office Action issued in U.S. Appl. No. 14/603,651 dated Jul. 25, 2017, 25 pages.

(Continued)

*Primary Examiner* — Peter Shaw
(74) *Attorney, Agent, or Firm* — Fish & Richardson P.C.

(57) ABSTRACT

In some implementations, a system may control an environment in which biometric data is entered when a user enrolls data for a user account or authenticates after having enrolled user data. Enrollment and/or authentication may be required to occur under one or more conditions. In some implementations, data from an electronic device associated with a user may be used to determine whether conditions on enrollment and/or authentication have been satisfied.

20 Claims, 21 Drawing Sheets

(56) References Cited

U.S. PATENT DOCUMENTS

| | | | |
|---|---|---|---|
| 2012/0034584 A1 | 2/2012 | Logan et al. | |
| 2012/0268241 A1* | 10/2012 | Hanna | G06F 21/32 340/5.52 |
| 2013/0082823 A1* | 4/2013 | Mallalieu | G07C 9/00087 340/5.82 |
| 2013/0127591 A1 | 5/2013 | Shay et al. | |
| 2013/0191898 A1* | 7/2013 | Kraft | G06F 21/31 726/6 |
| 2013/0209982 A1 | 8/2013 | Rooks et al. | |
| 2013/0231954 A1 | 9/2013 | Bryant | |
| 2013/0251216 A1 | 9/2013 | Smowton et al. | |
| 2013/0267204 A1 | 10/2013 | Shultz et al. | |
| 2013/0282589 A1 | 10/2013 | Shoup et al. | |
| 2014/0347479 A1* | 11/2014 | Givon | G06K 9/00342 348/143 |
| 2015/0019444 A1* | 1/2015 | Purves | G06Q 20/382 705/76 |
| 2015/0093988 A1* | 4/2015 | Konanur | H04B 5/0031 455/41.1 |
| 2015/0229624 A1* | 8/2015 | Grigg | H04L 63/08 726/7 |
| 2016/0029105 A1* | 1/2016 | Newman | H04N 5/77 386/281 |

FOREIGN PATENT DOCUMENTS

| | | |
|---|---|---|
| WO | 2013/095434 | 6/2013 |
| WO | 2013/134832 | 9/2013 |

OTHER PUBLICATIONS

"Biometrics," Wikipedia, the free encyclopedia, http://en.wikipedia.org/wiki/Biometrics (accessed Jan. 17, 2014), 13 pages.

"Biometrics: Who's Watching You?," Sep. 14, 2003, https://www.eff.org/wp/biometrics-whos-watching-you (accessed Jan. 17, 2014), 16 pages.

"What are the Best Biometrics for Securing Your Network?," Dec. 10, 2010, http://veritrix.com/what-are-the-best-biometrics-for-securing-your-network/ (Accessed Jan. 17, 2014), 4 pages.

Capkun et al., "Integrity Regions: Authentication Through Presence in Wireless Networks," WiSe'06, Sep. 29, 2006, 10 pages.

Dellutri et al., "Local Authentication with Bluetooth enabled Mobile Devices," Joint International Conference on Autonomic and Autonomous Systems and International Conference on Networking and Services—(icas-isns'05), Oct. 2005, 72 pages.

Faas, "Bluetooth LE is poised to revolutionize mobile security," CiteWorld, Dec. 19, 2013 [retrieved on Jan. 17, 2014]. Retrieved from the Internet: URL<http://www.citeworld.com/print/22800>, 4 pages.

Ni et al., "MPSL:A Mobile Phone-Based Physical-Social Location Verification System," Wireless Algorithms, Systems, and Applications, Lecture Notes in Computer Science, vol. 7405, pp. 488-499.

Riva et al., "Progressive authentication: deciding when to authenticate on mobile phones," Security'12 Proceedings of the 21st USENIX conference on Security symposium, 2012, 16 pages.

* cited by examiner

| User | Biometric Identifier | Security Level of Enrollment |
|---|---|---|
| Sam | Voice Sample | 2 |
| Sam | Face Image | 2 |
| Sam | Fingerprint | 2 |
| Jane | Voice Sample | 3 |
| Jane | Face Image | 3 |
| Todd | Fingerprint | 1 |
| ... | ... | ... |

FIG. 12

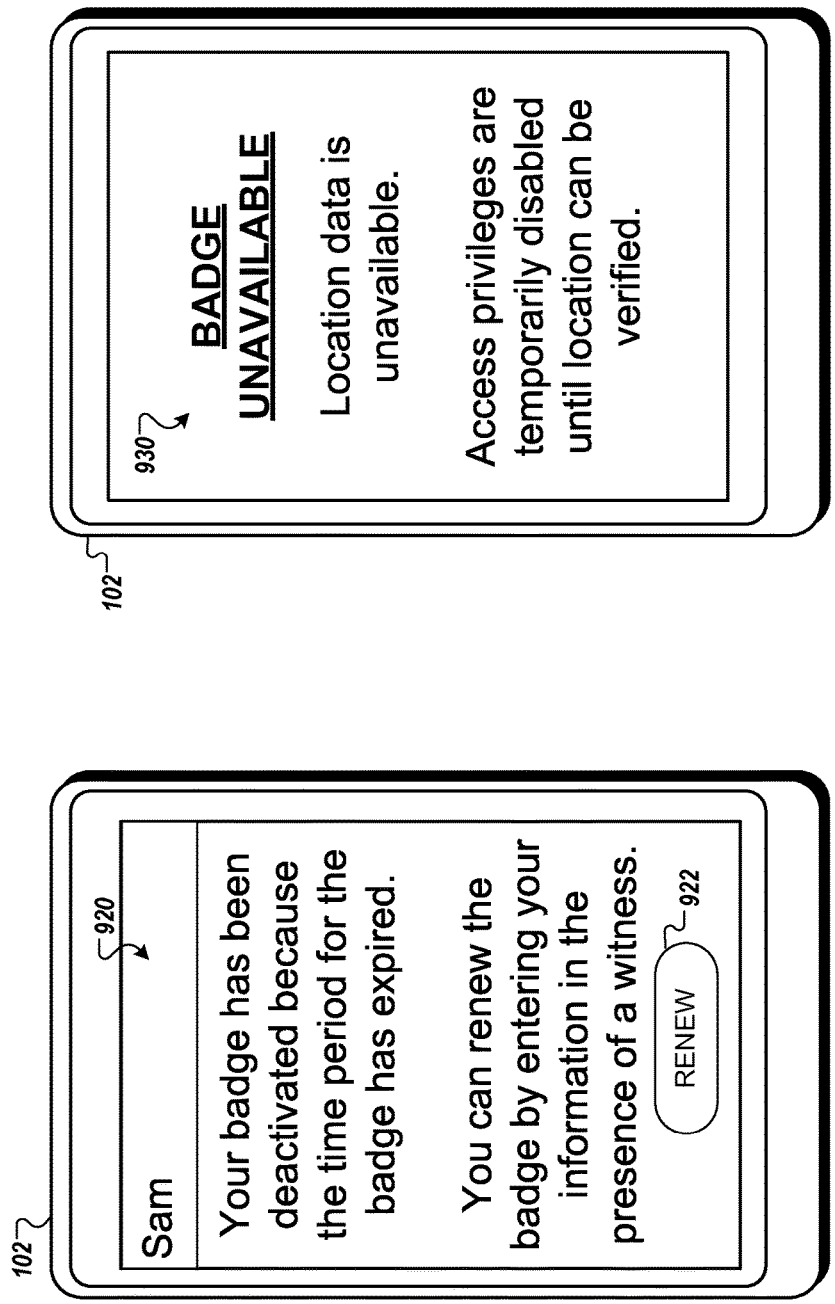

| Authentication Security Level (1132) | Accessible Areas (1134) | Authentication Conditions (1136) |
|---|---|---|
| 1 | Floor 1 | • Biometric authenication |
| 2 | Floors 1-5 | • Two forms of Biometric authentication,<br>• Data entered in the building,<br>• Approved by a witness of security level 2 |
| 3 | Floors 1-7 | • Face image and voice sample,<br>• Data entered in office #105,<br>• Approved by a witness of security level 3 |
| 4 | Floors 1-8 | • Face image, voice sample, and fingerprint,<br>• Data entered in office #602 using the ID kiosk,<br>• Approved by a witness of security level 4 that is selected from the approved list,<br>• Witness must provide face image, voice sample, and fingerprint |
| ... | ... | ... |

USER ENROLLMENT AND AUTHENTICATION

CROSS-REFERENCE TO RELATED APPLICATION

This application claims the benefit of U.S. Patent Application Ser. No. 61/931,347, filed on Jan. 24, 2014, which is incorporated herein by reference in its entirety.

TECHNICAL FIELD

This disclosure relates to enrollment and authentication of users.

BACKGROUND

To control access to information or physical facilities, users may be asked to verify their identity or authorization. To gain access, a user may be required to provide password, key, biometric scan, or other token. Authentication of a user may be performed using information about the user that was previously enrolled in an access control system.

SUMMARY

This disclosure relates to enrollment and authentication of users.

In one general aspect, a method may include the actions of: receiving a request to perform an action associated with a user account of a first user; identifying one or more conditions for performing the action, the one or more conditions including a witness being located within a threshold distance of the first user during entry of biometric data of the first user; receiving, from a first electronic device associated with the first user, first biometric data representing one or more biometric identifiers of the first user; identifying a second electronic device associated with a second user that is to serve as the witness of entry of biometric data of the first user; determining that the second electronic device is within the threshold distance of the first electronic device; receiving, from the second electronic device, second biometric data representing one or more biometric identifiers of the second user; determining that the second biometric data matches biometric data enrolled for a user account of the second user; determining that the one or more conditions are satisfied based on determining that the second electronic device is within the threshold distance of the first electronic device and determining that the second biometric data matches biometric data enrolled for a user account of the second user; and in response to determining that the one or more conditions are satisfied, performing the requested action associated with the user account of the first user.

Other embodiments of this aspect include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Implementations may include one or more of the following features. For example, determining that the second biometric data matches biometric data enrolled for a user account of the second user may include: accessing stored biometric data enrolled for a user account of the second user, the stored biometric data representing one or more stored biometric identifiers of the second user; evaluating the one or more biometric identifiers represented by the second biometric data for the second user against the one or more biometric identifiers represented by the stored biometric data for the second user; and determining that the second biometric data matches the stored biometric data for the second user based on the evaluation. The actions may include: transmitting, to the second electronic device, data requesting that the second user confirm that the second user witnessed the first user entering biometric identifiers; and receiving data indicating user input confirming that the second user witnessed the first user entering biometric identifiers. Determining that the one or more conditions are satisfied may be further based on receiving data indicating user input confirming that the second user witnessed the first user entering biometric identifiers. The actions may include transmitting, to the second electronic device, a request for one or more biometric identifiers of the second user, wherein receiving the second biometric data occurs in response to the request for one or more biometric identifiers of the second user.

Implementations may include one or more of the following features. For example, receiving, from the second electronic device, second biometric data representing the one or more biometric identifiers of the second user may include receiving second biometric data that includes a first biometric identifier for a first modality. Receiving a second biometric identifier for a second modality that is different from the first modality. Receiving, from the second electronic device, second biometric data representing the one or more biometric identifiers of the second user may include receiving data representing one or more of a face image data, eye vein data, iris data, retina data, speech data, fingerprint data, handwriting data, or movement data. Identifying one or more conditions for performing the action may include identifying conditions including entry of the biometric data within a predetermined geographical region. The actions may further include: receiving location data indicating a location of the first electronic device; and determining, based on the location data, that the first electronic device is located within the predetermined geographical region, wherein determining that the one or more conditions are satisfied may be further based on determining that the first electronic device is located within the predetermined geographical region.

Implementations may include one or more of the following features. For example, the actions may include: receiving first location data indicating a location of the first electronic device; and receiving second location data indicating a location of the second electronic device. Determining that the second electronic device is within the threshold distance of the first electronic device may include: determining a distance between the location of the first electronic device and the location of the second electronic device; and determining that the distance between the location of the first electronic device and the location of the second electronic device is less than the threshold distance. Determining that the second electronic device is within a threshold distance of the first electronic device may include: receiving first location data indicating that the first electronic device is within a threshold distance of a location beacon; and receiving second location data indicating that the second electronic device is within a threshold distance of the location beacon. Determining that the second electronic device is within a threshold distance of the first electronic device determining, based on the first location data and the second location data, that the first electronic device and the second electronic device are within a threshold distance of each other.

Implementations may include one or more of the following features. For example, identifying one or more conditions for performing the action may include identifying one or more conditions including presence of a witness that possesses a particular credential during entry of biometric data for the first user. The actions may include: accessing credential data indicating credentials associated with a user account of the second user; and determining, based on the credential data, that the second user possesses the particular credential. Determining that the one or more conditions are satisfied may be further based on determining that that the second user possesses the particular credential. Identifying one or more conditions for performing the action may include identifying conditions including authentication by the witness within a predetermined period of time of entry of biometric data by the first user. The actions may include: determining a first time that the first biometric data was captured; determining a second time that the second biometric data was captured; determining a period of time between the first time and the second time; and determining that the period of time is within the predetermined period of time. Determining that the one or more conditions are satisfied may be further based on determining that the period of time is within the predetermined period of time.

Implementations may include one or more of the following features. For example, determining that the second electronic device is within a threshold distance of the first electronic device may include: receiving location data indicating a location of the first electronic device and a location of the second electronic device; and determining that the second electronic device is within a threshold distance of the first electronic device based on the location data. The actions may include: receiving data indicating a time that the first biometric data was detected by the first electronic device; receiving data indicating a time that the location data was generated; determining a period of time between the time that the first biometric data was detected and a time that the location data was generated; and determining that the period of time satisfies a threshold; wherein determining that the one or more conditions are satisfied may be further based on determining that the period of time satisfies a threshold. Receiving, from the first electronic device associated with the user, the first biometric data representing one or more biometric identifiers of the first user may include receiving, from a phone of the first user, biometric data determined from biometric input detected by the phone of the first user. Receiving, from the second electronic device, second biometric data representing one or more biometric identifiers of the second user may include receiving, from a phone of the second user, biometric data determined from biometric input detected by the phone of the second user.

Implementations may include one or more of the following features. For example, the actions may include: receiving a request to enroll biometric data for a user account of a third user; identifying one or more conditions for enrolling biometric data for the user account of the third user, the one or more conditions including a witness being located within a threshold distance of the first user during entry of biometric data that the third user is requesting to enroll; receiving, from a third electronic device associated with the third user, third biometric data representing one or more biometric identifiers of the third user; determining that an electronic device associated with another user is not within a threshold distance of the third electronic device during entry of the biometric data for the third user; and in response to that an electronic device associated with another user is not within a threshold distance of the third electronic device during entry of the biometric data for the third user, transmitting, to the third electronic device, information indicating that the third biometric data is not enrolled for the user account of the third user. The actions may include: receiving a request to enroll biometric data for a user account of a third user; identifying one or more conditions for enrolling biometric data for the user account of the first user, the one or more conditions including presence of a witness within a predetermined distance of the third user during entry of biometric data for the third user; receiving, from a third electronic device associated with the third user, third biometric data representing one or more biometric identifiers of the third user; receiving, from a fourth electronic device associated with a fourth user, fourth biometric data representing one or more biometric identifiers of the fourth user; determining that the fourth biometric data does not match stored biometric data enrolled for a user account of the fourth user; and in response to determining that the fourth biometric data does not match the stored biometric data enrolled for the user account of the fourth user, transmitting, to the third electronic device, information indicating that the third biometric data is not enrolled for the user account of the third user.

Implementations may include one or more of the following features. For example, receiving the request to perform the action associated with the user account of the first user may include receiving a request to enroll biometric data of the first user with the user account of the first user; and performing the requested action associated with the user account of the first user may include storing, in electronic storage, account data that enrolls the first biometric data for the user account of the first user. Receiving a request to perform the action associated with the user account of the first user may include receiving a request to perform an action related to a credential, the action requiring biometric authentication of the first user. The actions may include determining that the received biometric data for the first user matches stored biometric data enrolled for a user account of the first user. Determining that the one or more conditions are satisfied may be further based on determining that the received biometric data for the first user matches the stored biometric data enrolled for the user account of the first user. Receiving the request to perform the action may include receiving a request to activate or issue a credential of the first user; and wherein performing the action indicated by the request may include activating or issuing the credential of the first user.

In another general aspect, a method may include: receiving a request to perform an action associated with a user account of a user; identifying one or more conditions for performing the action, the one or more conditions including the entry of biometric input to a first electronic device associated with the user occurring within a designated area; receiving, from the first electronic device associated with the user, biometric data representing one or more biometric identifiers from the biometric input of the user; receiving interaction data indicating interaction of the first electronic device with a second electronic device that is located within the designated area; determining, based on the interaction data, that the second electronic device is within a threshold distance of the first electronic device when the biometric input of the user is entered to the first electronic device associated with the user; determining that the one or more conditions are satisfied based on determining that the second electronic device is within a threshold distance of the first electronic device when the biometric input of the user is entered to the first electronic device associated with the user; and in response to determining that the one or more conditions are satisfied, performing the requested action associated with the user account of the user.

Other embodiments of this aspect include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Implementations may include one or more of the following features. For example, receiving a request to perform the action associated with the user account of the user may include receiving a request to perform an action related to a credential, the action requiring biometric authentication of the user. The actions may include determining that the received biometric data for the user matches stored biometric data enrolled for a user account of the user. Determining that the one or more conditions are satisfied may include determining that the one or more conditions are satisfied may be further based on determining that the received biometric data for the user matches the stored biometric data enrolled for the user account of the user. Determining that the received biometric data for the user matches the stored biometric data enrolled for a user account of the user may include: accessing stored biometric data enrolled for the user account of the user, the stored biometric data representing one or more stored biometric identifiers of the user; evaluating the received biometric data for the user against the stored biometric data enrolled for the user account of the user; and determining, based on evaluating the received biometric data for the user against the stored biometric data enrolled for the user account of the user, that the received biometric data for the user matches the stored biometric data enrolled for the user account of the user.

Implementations may include one or more of the following features. For example, receiving the request to perform the action related to a credential that requires biometric authentication of the user may include receiving a request to activate or issue a credential of the user. Performing the action indicated by the request may include activating or issuing the credential of the user. The actions may include: accessing credential data indicating that the credential expires after a predetermined time; determining that a current time is after the predetermined time; and in response to determining that the current time is after the predetermined time, disabling the credential. The actions may include: accessing credential data indicating that the credential expires if the user leaves a predetermined geographical region; receiving data indicating a location of the first electronic device; determining that the location of the first electronic device is outside the predetermined geographical region; and in response to determining that the location of the first electronic device is outside the predetermined geographical region, disabling the credential.

Implementations may include one or more of the following features. For example, the actions may include: accessing credential data indicating that the credential expires if motion of the first electronic device differs from motion represented by motion data associated with the user account of the user; receiving motion data indicating motion of the first electronic device; accessing stored motion data associated with the user account of the user; evaluating the received motion data against the stored motion data; determining, based on evaluating the received motion data against the stored motion data, that the motion indicated by the received motion data is different from the motion indicated by the stored motion data; and in response to determining, based on evaluating the received motion data against the stored motion data, that the motion indicated by the received motion data is different from the motion indicated by the stored motion data, disabling the credential. Receiving the request to perform an action may include receiving, from the first electronic device, a request to make a credential of the user active on the first electronic device, wherein biometric authentication of the user is required to make the credential active; and performing the action indicated by the request may include making the credential of the user active on the first electronic device. The user may be a first user, and the actions may include: transmitting, to the second electronic device, data requesting that a second user confirm that the second user witnessed the first user entering the biometric input; and receiving data indicating user input confirming that the second user witnessed the first user entering the biometric input. Determining that the one or more conditions are satisfied may be further based on receiving data indicating user input confirming that the second user witnessed the first user entering the biometric input.

Implementations may include one or more of the following features. For example, receiving biometric data for the user may include receiving biometric data that includes a first biometric identifier for a first modality, and receiving a second biometric identifier for a second modality that is different from the first modality. Receiving, from the second electronic device, biometric data for the user may include receiving data representing one or more of a face image data, eye vein data, iris data, retina data, speech data, fingerprint data, handwriting data, or movement data. Receiving the interaction data indicating interaction of the first electronic device with a second electronic device that is located within the designated area may include receiving, from the first electronic device, interaction data indicating that the first electronic device wirelessly received a location beacon message that the second electronic device transmits within a limited area, the second electronic device being in a fixed location. The first electronic device may be a mobile phone of the user, and the second electronic device may be a mobile phone of another user. The actions may include: receiving monitoring data indicating information detected by the second electronic device during entry of the biometric input to the first electronic device; and evaluating the monitoring data. Determining that the one or more conditions are satisfied may be further based on evaluating the monitoring data. Evaluating the monitoring data may include: comparing the biometric data with the monitoring data; and determining, based on comparing the biometric data with the monitoring data, that the one or more biometric identifiers represented by the biometric data match the one or more biometric identifiers represented by the monitoring data. Determining that the one or more conditions are satisfied may be further based on determining, based on the comparison, that the one or more biometric identifiers represented by the biometric data match the one or more biometric identifiers represented by the monitoring data.

Implementations may include one or more of the following features. For example, comparing the biometric data with the monitoring data may include comparing audio data or image data from the first electronic device with audio data or image data detected by the second electronic device. Determining, based on comparing the biometric data with the monitoring data, that the one or more biometric identifiers represented by the biometric data match the one or more biometric identifiers represented by the monitoring data may include determining that voice characteristics or face characteristics indicated by the audio data or image data from the first electronic device match voice characteristics or face characteristics indicated by the audio data or image data detected by the second electronic device. The actions may include determining that the second electronic device is designated as a trusted device, and determining that the one or more conditions are satisfied may be further based on determining that the second electronic device is designated as a trusted device. Receiving the request to perform the action associated with the user account of the first user may include receiving a request to enroll biometric data of the first user with the user account of the first user, and performing the requested action associated with the user account of the first user may include storing, in electronic storage, account data that enrolls the first biometric data for the user account of the first user.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIG. 12 is table showing examples of records of enrolled biometric data.

FIGS. 21-24 are examples of user interfaces of a credential management application.

FIG. 28 is a table of examples of authentication conditions.

DETAILED DESCRIPTION

Figure 2:
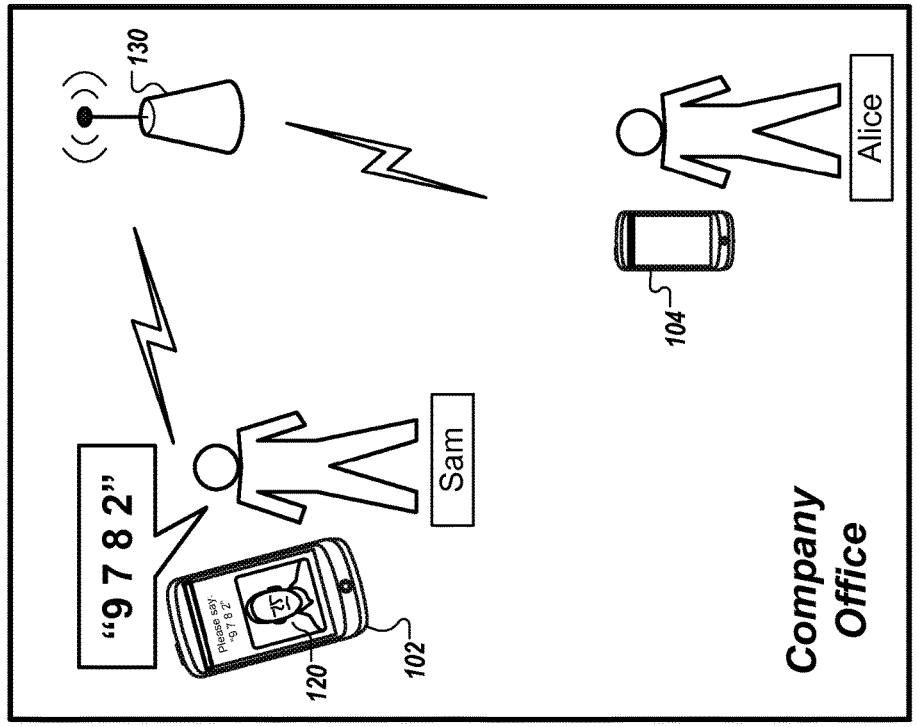
FIGS. 1-6 are diagrams of an example of enrollment under predetermined conditions.

Techniques are described for collecting information for enrolling or authenticating users in controlled manner. The environment in which users provide data, such as biometric identifiers, that is used for authentication may be controlled to reduce the likelihood of false data being entered. Various conditions or requirements may be placed on the entry of user information, for example, by only accepting or trusting data that is provided in at a specified time, place, or proximity to others, or using specific equipment. Depending on the implementation and the level of security desired, some aspects of the environment for entering data may be controlled, while other aspects may not be controlled.

In some implementations, input of user data, such as biometric identifiers of a user, is supervised or proctored by a human and/or electronic devices. For example, data collection can be supervised or proctored by a trusted human witness that observes the data collection process. As another example, data collection can be supervised by electronic means, such as video recording equipment or the interaction of various devices. Entry of biometric information may be required to occur using or near a specific device, any of a predetermined set of devices, or a specific type of device.

User devices, such as phones, smartphones, tablet computers, wearable computers, watches, navigation devices, laptop computers, etc., can detect biometric identifiers, which may be enrolled in an access control system or may be used to verify a user's identity. User devices can also collect data that can be used to verify that conditions for data collection are satisfied. For example, user devices can provide data indicating, for example, location, proximity to other users, and so on. An access control system may use information from various user devices and/or other devices to determine whether the appropriate conditions for entry of data have been satisfied.

In some implementations, the initial enrollment or registration of data about a new user can be required to occur in a controlled environment. For example, an organization may set one or more conditions that must be met in order to enroll or register biometric data for a new user account. In some instances, evidence of a trusted human witness may be required. The witness can observe the new user entering biometric data, and the witness can verify that the person whose biometric data is captured is actually the person he claims to be. The witness may then endorse or approve the enrollment, and may provide information to verify the witness's identity, before the biometric data for the new user is trusted or linked to the new user account. Other conditions may additionally or alternatively be set. For example, enrollment of new user data may be limited to particular times or places.

Conditions that control the environment in which user data is entered limit the risk of false data being registered. In an unsupervised environment, a malicious user could potentially register false information, for example, by passing off a voice recording or face image of a different person as his own. If an imposter succeeded in enrolling false biometric data, for example, by deceiving an access control system into enrolling the imposter's biometric data with a victim's identity, the imposter could potentially assume the victim's identity and gain unauthorized access. However, conditions that control the environment for entering data, such as requiring a witness or other security measure during enrollment, make it much less likely that an impostor would succeed in registering false information.

One or more conditions may be required to be satisfied for authentication of a user whose data was previously enrolled. For example, an organization may set conditions that control aspects of the environment in which a user inputs biometric data that will be evaluated against previously enrolled biometric data for the user. In an uncontrolled environment, an imposter could potentially submit fake biometric data, for example, using a recording of another person's voice, an image of another person's face or fingerprint, and so on. By allowing biometric data used for authentication to be entered under predetermined conditions, the potential for unauthorized access may be reduced. As an example, a condition for authentication may be that biometric data must be entered at a particular location. As another example, a condition may be that biometric data must be entered within a particular range of time. As another example, a condition may be that biometric data must be witnessed by a user with a particular credential. In some implementations, a witness may be required to enter biometric data to confirm the user's authentication, and/or a witness may be required to be located within a particular distance of the user. Various combinations of conditions may be used.

In some implementations, the proximity of a user who acts as a witness to a user who enrolls or authenticates himself, as well as the locations of the users, may be determined using data from electronic devices associated with the users. For example, an authenticating user and a witness may each have a phone with location sensing capability, and phones can provide their locations to a server system. The authenticating user and the witness may each enter biometric data at their respective phones. When the received biometric information matches previously enrolled biometric data, the users are likely present at the same locations as their phones, and the locations of the phones may represent the likely locations of the respective users.

In some implementations, after a user has authenticated and has activated a credential, the credential may expire after certain expiration conditions occur. For example, in a high-security building, an access badge credential for entry to the building may expire at the end of each day, requiring users to authenticate under predetermined conditions to renew the access badge credential each day. In this manner, if a thief steals the electronic device, e.g., phone, that serves as the access badge, the thief could not gain access after the end of the day the badge is stolen. Other situations may additionally or alternatively cause a credential to expire or be unavailable for use. For example, a credential may expire if a user leaves a defined geographical area. When the user's phone or other device indicates that the device has exited the defined geographical area, the device may cancel the credential. The device may additionally or alternatively send data indicating the location of the device to a server system, and the server system may cancel the credential.

FIGS. 1-6 illustrate an example of enrolling biometric data for a user. In the example, the environment in which biometric data is entered is required to meet one or more conditions. For example, biometric data must be entered at a particular location and be witnessed by another user to be enrolled. A new employee provides biometric identifiers in the presence of a witness, and the witness approves the entry of the new employee's data as being valid. The witness also provides a biometric identifier of the witness to prove the witness's identity. Because the conditions for enrollment are satisfied, the new employee's biometric data is enrolled in the system for later use in authenticating the new employee.

Figure 1:
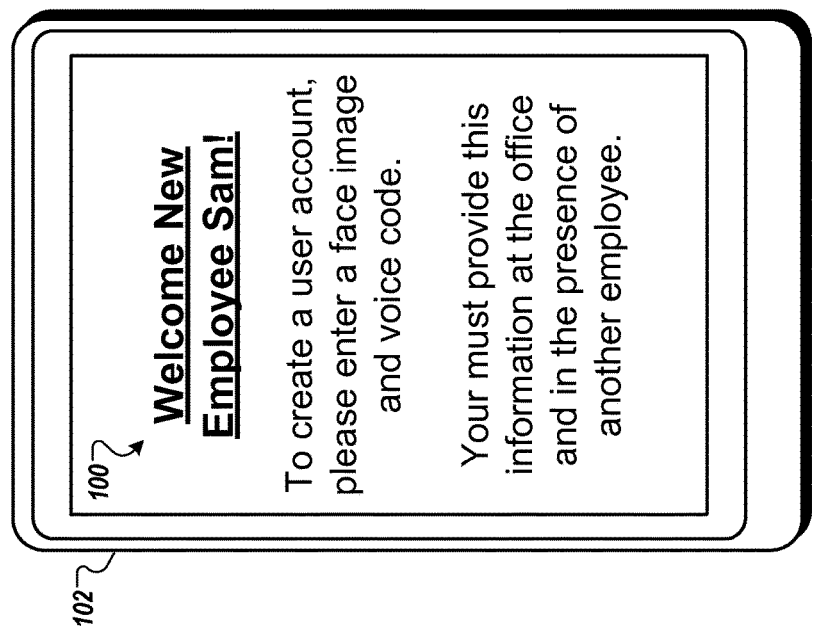

In FIG. 1 illustrates an example of a user interface 100 for informing a user of conditions for enrolling biometric data. The user interface 100 may be displayed on a phone or other electronic device 102. In some implementations, the user interface 100 is provided by an application running on the electronic device 102. In other implementations, the user interface 100 is a rendering of a web page or other document. The user interface 100 describes conditions that must be satisfied for the enrollment of the biometric data to be successful. For example, the user interface 100 may direct the new employee to visit a particular building or room during particular hours in order to provide biometric data.

In the illustrated example, a new employee, Sam, views the user interface 100 on his phone, through a credential management application provided by his company or a third party. The user interface 100 indicates that Sam should provide a face image and voice sample to create a user account with the company. The user interface 100 also indicates that the information should be entered at the company's office, and in the presence of another employee.

FIG. 2 illustrates an example of a user entering biometric data in the presence of a witness. For example, the new employee, Sam, enters biometric information in the presence of another employee, Alice, while located at his company's office building. Sam has his electronic device 102 with him, and Alice also has an electronic device 104, e.g., Alice's phone. The electronic devices 102, 104 can be used to determine whether the conditions for associating biometric data with Sam's user account have been satisfied. Both of the electronic devices 102, 104 can run the credential management application and may communicate with a server system associated with the credential management application, referred to as a credential server system.

The credential management application on the electronic device 102 allows Sam to input biometric identifiers using the electronic device. Sam captures an image 120 of Sam's face using a camera of the electronic device 102, and the image 120 is received by the credential management application. The credential management application prompts Sam to speak a certain code or phrase, e.g., the four digits "9 7 8 2," and when Sam speaks, the audio is recorded by a microphone of the electronic device 102. In this manner, the credential management application obtains Sam's biometric data from Sam's phone.

In the example, one of the conditions for associating biometric data with Sam's user account is that the biometric data must be entered at the company office. Sam's electronic device 102 can generate location data indicating a location of the electronic device. The credential management application accesses the location data, and sends the location data to the credential server system, which may determine whether the electronic device 102 is in the required location. Various techniques for generating location data may be used. For example, a Global Positioning System (GPS) receiver of the electronic device 102 may determine a location of the electronic device 102. As another example, a wireless communication receiver, e.g., a Bluetooth or Wi-Fi network adapter, of the electronic device 102 may receive a beacon message that indicates a location of the electronic device 102. Location beacons 130 in various locations may each send beacon messages within a limited area. Receipt of a beacon message from a particular location beacon 130 can indicate that the receiving device is in the limited area associated with the location beacon 130, which could be a particular floor of a building, a particular room, etc.

Alice's electronic device 104 also has the capability to generate location data indicating the location of the electronic device 104, for example, using a GPS receiver, receiving location beacons received over a Bluetooth or Wi-Fi connection, or other techniques. The credential management application on the electronic device 104 sends location data indicating the location of the electronic device 104 to the credential server system. With location data from both of the electronic devices 102, 104, the credential server system can determine that the electronic device 104 is located near the electronic device 102. In response to determining that the electronic devices 102, 104 are near each other, the credential server system may identify Alice as a potential witness to the entry of Sam's biometric information. In some implementations, Alice may be indicated to be the witness in another manner, for example, based on input from Sam at the electronic device 102, input from Alice at the electronic device 104, or communication of the electronic devices 102, 104 with each other. Once the credential server system identifies Alice as a potential witness, the credential server system may request that Alice confirm that she witnessed the entry of Sam's biometric data. Location data from the electronic device 104 can indicate that the electronic device 104 is at the company office and/or within a particular distance of the electronic device 102, allowing the credential server system to verify that the witness is present and capable of witnessing Sam's data being entered.

Figure 3:
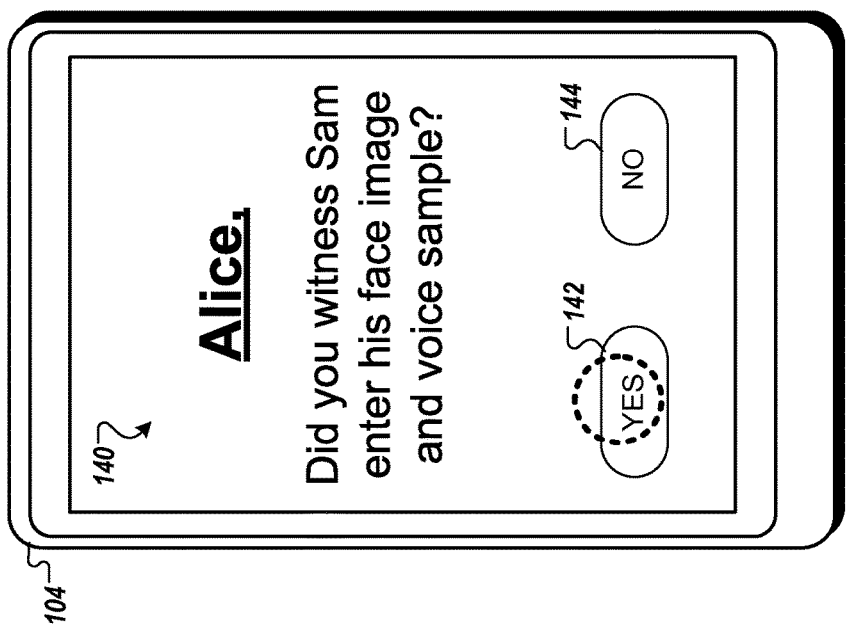

FIG. 3 illustrates an example of a user interface 140 permitting a witness to approve the entry of another user's biometric data. When the credential server system identifies the witness, the credential server system can send data to the witness's electronic device 104 indicating that the credential management application on the electronic device 104 should display the user interface 140. The credential management application can notify the witness that input is needed by causing the electronic device 104 to vibrate, play a sound, or produce another alert.

In the illustrated example, the user interface 140 asks whether the witness observed the entry of Sam's biometric data. The user interface 140 includes an approval control 142 that Alice can interact with to approve or endorse Sam's biometric data. The user interface 140 also includes a disapproval control 144 that the witness can interact with to indicate that the biometric data is not approved. For example, Alice could interact with the disapproval control 144 if, for example, she could not determine if the person entering the data was really Sam, if the person who entered the data acted suspiciously, or if Alice did not witness the data being entered. In the example, Alice observed Sam capture his face image and record his voice code using the electronic device 102. Alice may verify Sam's identity, to make sure that Sam is who he says he is. Alice may have already met Sam and may recognize him, or Alice may request identification from Sam, e.g., a driver's license or other identification, to be sure that it was actually Sam who she saw entering the data. Satisfied that she saw Sam validly entering his biometric data, Alice interacts with the approval control 142 to indicate that Alice witnessed Sam's actions. The credential management application provides data indicating Alice's input to the credential server system.

Figure 4:
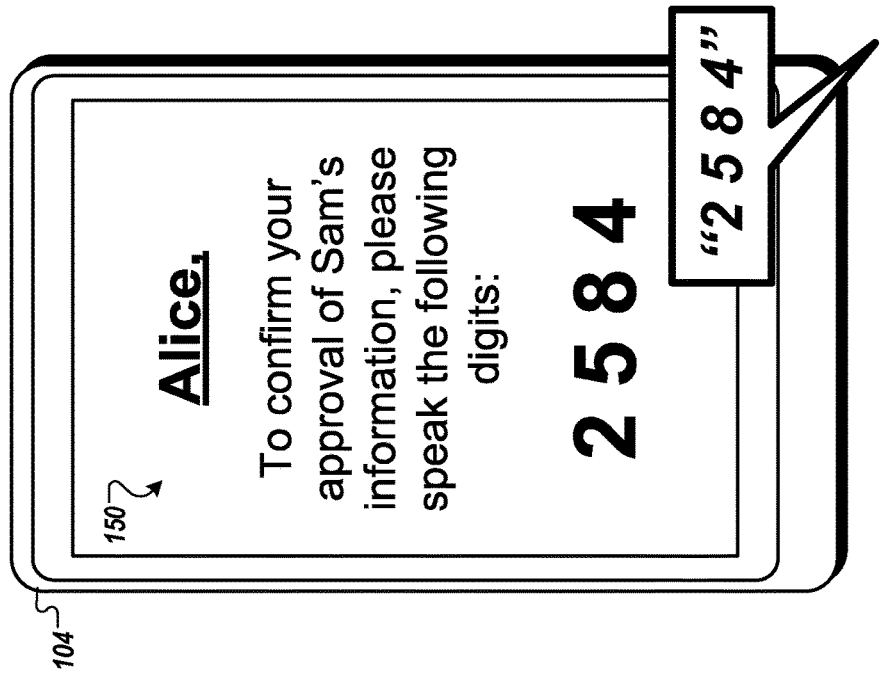

FIG. 4 illustrates an example of a user interface 150 for receiving biometric information from a witness. In some implementations, it can be useful to have the witness verify his or her identity so that, for example, if an imposter had stolen the electronic device 104, the imposter could not falsify the witnessing of the enrollment. The credential management application on the electronic device 104 provides the user interface 150 and requests that Alice enter one or more biometric identifiers to the electronic device 104. For example, the user interface 150 indicates a series of digits or other items for Alice to read, and the microphone of the electronic device 104 records Alice's speech. The electronic device 104 sends the recorded speech, or data derived from the speech, to the credential server system for processing, to verify that it is actually Alice, the owner of the electronic device 104, who indicated that entry of Sam's data was witnessed. If an imposter had improperly obtained possession of the electronic device 104, e.g., by stealing Alice's phone, the imposter would likely not be able to provide Alice's voice code.

In some implementations, multiple forms of biometric data may be obtained from the witness, to allow multi-factor verification of the witness's identity. For example, a face image may be captured as well as a speech sample. Alternatively, a fingerprint and speech sample or other combination of two or more may be captured and provided to the credential server system.

Figure 5:
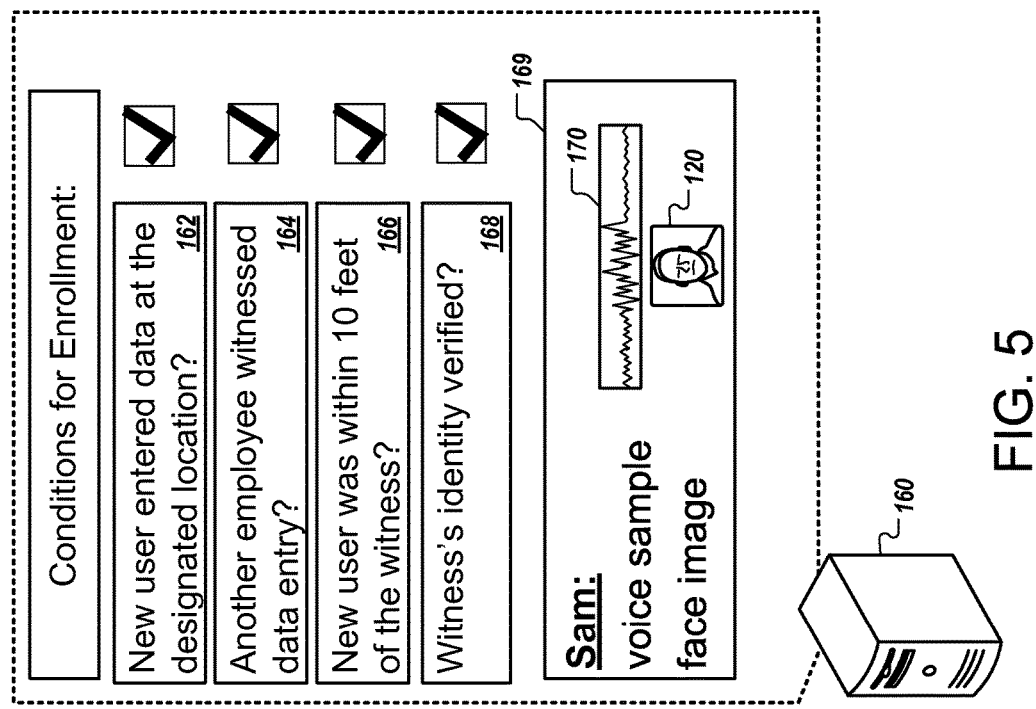

FIG. 5 illustrates processing to determine whether the conditions on enrollment of biometric data have been satisfied. A credential server system 160 accesses data that indicates the conditions for enrolling Sam's biometric data. In the example, the conditions include, for example: (i) that the biometric data must be entered in a designated location (e.g., the company office) (162); (ii) that another employee must witness the data being entered (164); (iii) that the biometric data must be entered within 10 feet of the witness (166); and (iv) that the witness's identity must be verified (168).

Using data received from the electronic devices 102, 104, the credential server system determines that each of the conditions are satisfied. Using location data from the electronic device 102, the credential server system determines that the electronic device 102 was located at the company office when the biometric data was entered at the electronic device 102. Using data indicating the user input from Alice, shown in FIG. 3, the credential server system determines that a witness was present. The credential server system may also access employee records to determine that Alice is, in fact, an employee who is qualified to act as a witness for the enrollment. Using the location data from the electronic devices 102, 104, the credential server system determines that the electronic devices 102, 104, and thus their respective users, were within 10 feet of each other. For example, the location data indicates that both electronic devices 102, 104 received a beacon from the location beacon 130, which transmits in a range of only 10 feet. Using the biometric data captured by the electronic device 104, the credential server system 160 verifies Alice's identity, for example, by determining that the characteristics of the recorded voice sample match characteristics of voice samples previously enrolled for Alice's user account.

Having determined that the conditions for enrolling Sam's biometric data are satisfied, the credential server system enrolls Sam's biometric data. For example, the credential server system stores enrollment data 169 that associates the face image 120 and speech sample 170, or data representing features extracted from the face image 120 and speech sample 170, with Sam's user account. The enrollment data 169 can be used a reference or standard that is trusted as representing Sam's biometric attributes. When a user later attempts authentication using Sam's user account, newly acquired or "live" data can be captured from the user and compared with the enrollment data 169 to determine whether the user has biometric attributes matching those stored for Sam's user account.

Figure 6:
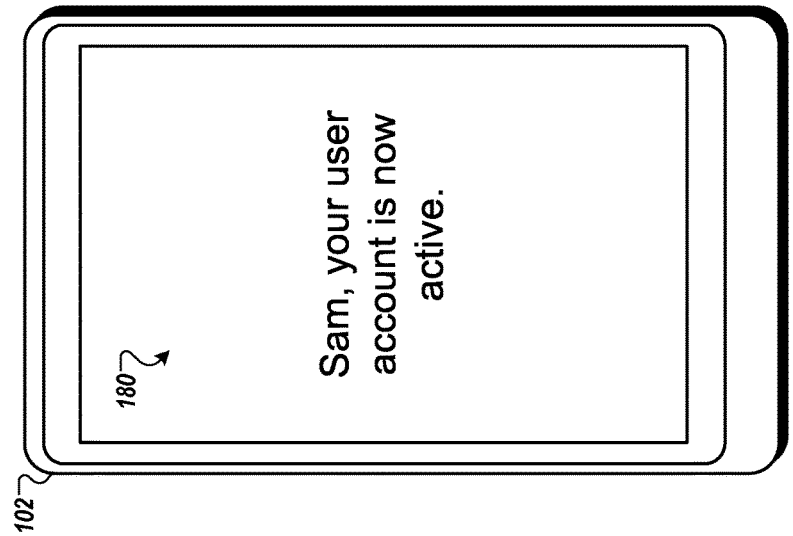

FIG. 6 illustrates a user interface 180 indicating to a user that enrollment of biometric data has been successful. The credential server system communicates with Sam's electronic device 102 to indicate that Sam's user account has been updated to include the biometric data that Sam entered. The electronic device 102 then displays the user interface 180.

If the credential server system 160 had determined that one or more of the conditions for enrolling Sam's biometric data had not been satisfied, then the enrollment would not occur, and the biometric data that was entered would not be associated with Sam's user account. The credential server system 160 could indicate that enrollment was not successful. The electronic device 102 could display a user interface that indicates the reason that enrollment failed. For example, if the witness was too far away, the electronic device 102 could indicate that enrollment should be repeated while the user is closer to the witness.

Figure 7:
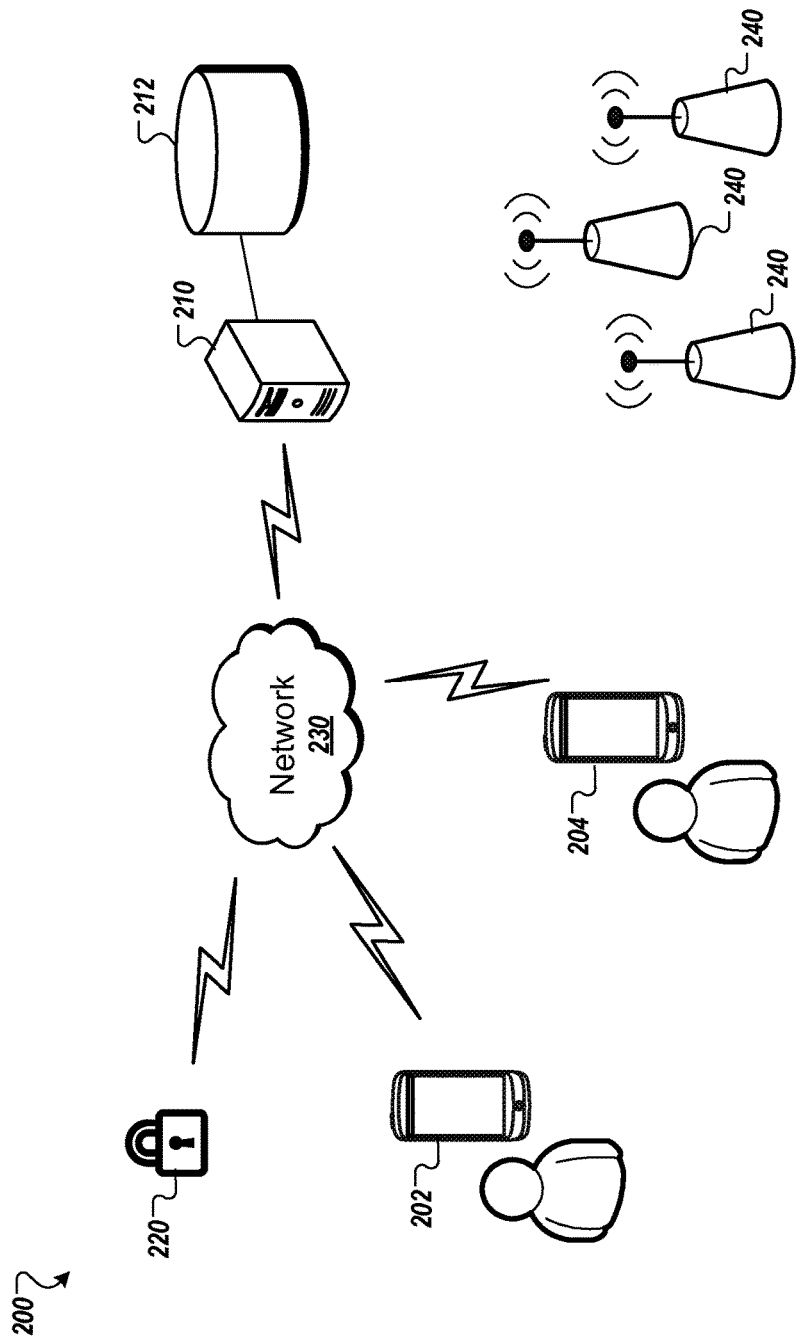
FIG. 7 is a diagram of an example of a system for user enrollment and authentication.

FIG. 7 illustrates an example of a system 200 for user enrollment and authentication. For illustrative purposes, several elements illustrated in FIG. 7 and described below are represented as monolithic entities. However, these elements each may include and/or be implemented on numerous interconnected computing devices and other components that are designed to perform a set of specified operations.

The system 200 includes a computing system 210, electronic devices 202, 204, and an access control device 220. The computing system 210, the electronic devices 202, 204, and the access control device 220 communicate over a network 230, which may include one or more public or private networks and may include the Internet. The system 200 also includes one or more data storage devices 212, which are accessible to the computing system 210. The system 200 also includes one or more location beacons 240 that are each located at different locations.

The computing system 210 may represent the credential server system 160 of FIG. 5, and may perform a number of functions including, for example, identifying conditions for enrolling biometric data or authenticating a user, determining whether the conditions are satisfied, and enrolling biometric data or authenticating users. The computing system 210 may receive a variety of inputs from the electronic devices including location data that indicates locations of the electronic devices 202, 204, biometric data for user of the electronic devices 202, 204, user input entered at the electronic devices 202, 204, requests to enroll biometric data for user accounts, requests to authenticate users, requests to perform actions related to credentials, such as requests to activate, transfer, renew, or use a credential, and other inputs. The computing system 210 may be configured to issue, revoke, modify, or otherwise manage credentials and the use of credentials.

The computing system 210 accesses and stores data in the one or more data storage devices 212. For example, the computing system 210 may access enrollment data to obtain enrolled biometric identifiers for verifying a user's identity. The computing system 210 may cause additional enrollment data to be stored, in order to enroll biometric data for user accounts. The computing system 210 may access credential data to determine whether a credential is active or valid, and may modify credential data to cause credentials to be active or inactive. The computing system 210 may communicate with the access control device 230 to allow or disallow access to resources, and the computing system 210 may communicate with electronic devices 202, 204 to allow or disallow use of credentials or privileges associated with user accounts.

The electronic devices 202, 204 may be any of a number of different types of computing devices including, for example: mobile phones; smartphones; personal digital assistants; navigation devices; laptop, tablet, and netbook computers; wearable computers; and desktop computers including personal computers; special purpose computers; general purpose computers; and/or combinations of special purpose and general purpose computers. Internal or external storage components for each of the electronic devices 202, 204 may store a client application for interfacing with the computing system 210 and/or access control devices 220. Additionally or alternatively, the electronic devices 202, 204 may be configured to interface with the computing system 210 and/or access control devices 220 without a specific client application, for example, using a web browser. An example of an electronic device described below with respect to FIG. 8.

The location beacons 240 may transmit wireless beacons or messages that include information from which a location can be determined. For example, each of the location beacons 240 may have a particular identifier or code assigned, as well as an associated geographical area. Each location beacon 240 may transmit a message with its identifier within the associated geographical area, for example, in a radius of 30 feet, or 20 feet, or 10 feet, and so on. The messages may be transmitted by Bluetooth, Wi-Fi, or any other suitable wireless communication protocol. Because the message sent by each location beacon 240 may be transmitted only within its associated geographical area, receipt of a beacon message from a location beacon 240 at an electronic device 202, 204 may indicate that the electronic device 202, 204 is located within the geographical area associated with the location beacon 240. In some implementations, the location beacons 240 may receive messages from electronic devices 202, 204 that identify the electronic devices 202, 204 and indicate that the electronic device that sent the message is within a particular area of the location beacon 240 that receives the message.

The access control device 220 may control access to one or more resources. The access control device 220 may include a physical lock that controls access to a physical item or space, such as a car, a room, a building, etc. Additionally or alternatively, the access control device 220 may control access to intangible resources, such as data, computer system access, user account access, finance records, and so on. The access control device 220 may be configured to restrict access to a resource until a proof of authorization is provided, either from an electronic device 202, 204 or from another device.

The access control device 220 may allow or deny access based on instructions from the computing system 210. For example, the computing system 210 may determine when access should be granted and when access should be denied, and may instruct the access control device 220 accordingly. Additionally or alternatively, the access control device 220 may include one or more processors configured to determine whether access should be granted and whether access should be denied.

In some implementations, the access control device 220 is configured to receive user input. For example, the access control device 220 may be configured to receive biometric input to verify the identity of a user attempting to gain access. For example, the access control device may include a microphone to receive a speech sample, a camera to capture a face, eye, or other image, a fingerprint scanner, a keypad, or other input device. In some implementations, the access control device 220 includes a camera to receive a QR code or other visual code, a microphone to receive a sonic or ultrasonic code, an RFID reader or NFC reader to receive codes, or other input mechanisms.

The system 200 may include other systems and devices. For example, the system 200 may include a biometric input device, such as a kiosk or other system, for receiving biometric data. The biometric input device may have capabilities for acquiring higher quality biometric input than, for example, a phone. For example, a biometric input kiosk may include a higher resolution camera than a typical phone. In some implementations, conditions for enrolling biometric data or authenticating a user may require that biometric data be entered at a particular kiosk or device, which may be a particular fixed location. A human witness may or may not be a condition for enrollment or authentication. The kiosk or other device may transmit data to the computing system 210 for further processing.

As another example, the system 200 may include a video camera or other monitoring device that may be used to control an environment for entering biometric data. When enrollment or authentication requires entering data within the range of the monitoring device, a human witness may or may not be required.

Figure 8:
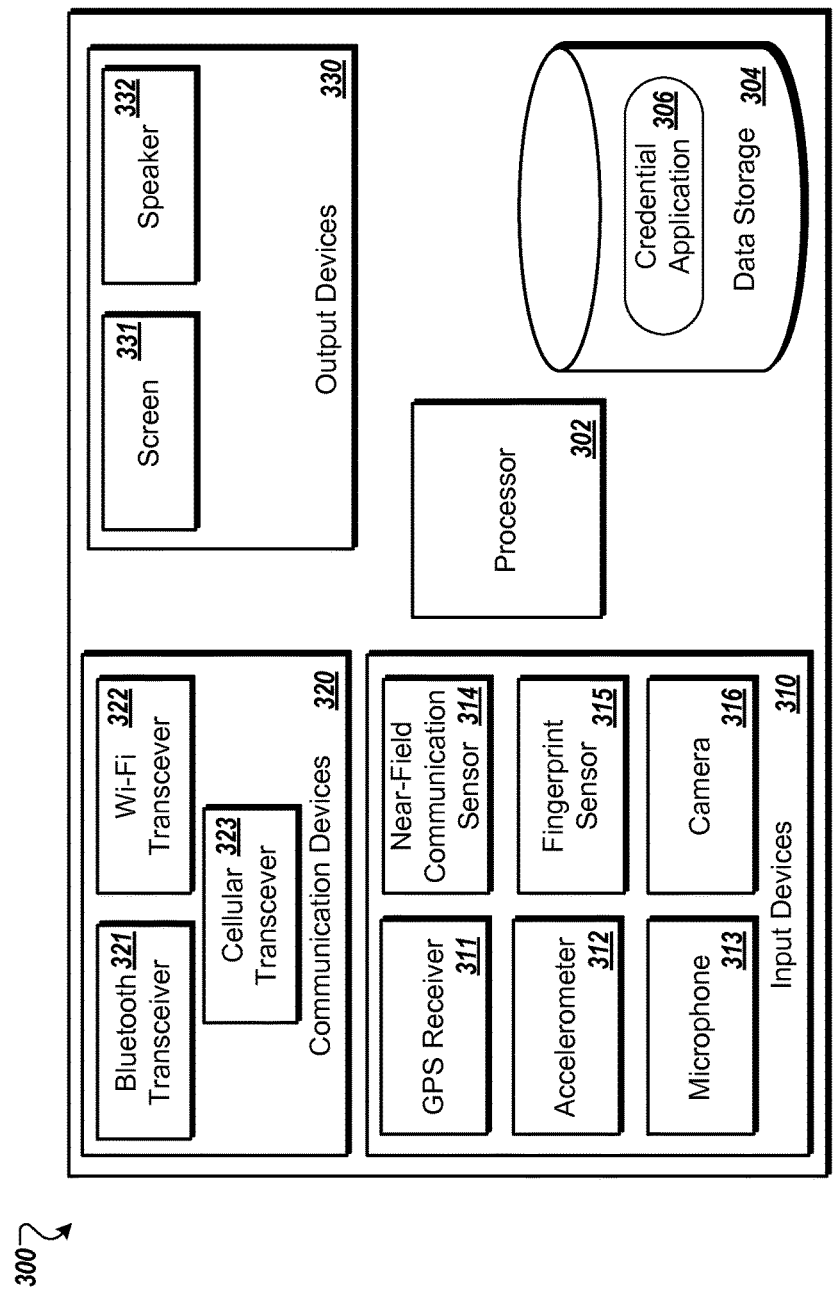
FIG. 8 is a block diagram of an example of a user device.

FIG. 8 illustrates an example of an electronic device 300. The electronic device 300 may represent any of the electronic devices 102, 104, 202, 204 discussed above, or the other electronic devices discussed below. The electronic device may be, for example, a mobile phone, a smartphones, a personal digital assistant, a navigation device, a laptop computer, a tablet computer, a netbook computer, a wearable computer, a desktop computer, or other suitable electronic device.

The electronic device 300 may include a processor 302 and data storage 304. The data storage 304 may include an operating system and one or more application programs that can be executed by the processor 302. For example, the data storage 304 may include a credential application 306 that a user may use to enroll biometric data, authenticate with an access control system, and/or receive, activate, and use credentials. The credential application 306 may provide access to the credentials and privileges of one or more user accounts. Each user account may correspond to a different user identity. In some implementations, the credential application 306 of the electronic device 300 is associated with a single user and provides access to the credentials or privileges associated with only the user account for the single user. Alternatively, the credential application 306 may permit the credentials of multiple users to be used or managed. In some implementations, in addition to or instead of using a credential application 306, a web browser may be used to access a network-based interface for performing the same functions as the credential application 306.

The electronic device 300 may include one or more input devices 310. The input devices 310 may be used to enter user inputs, including biometric inputs, location data, and other forms of input. The electronic device 300 may include one or more of a GPS receiver 311, an accelerometer 312, a microphone 313, a near-field communication sensor 314, a fingerprint sensor 315, and a camera 316. Other sensors and input devices may additionally or alternatively be included.

The electronic device 300 may include one or more communication devices 320, permitting the electronic device 300 communicate using one or more communication channels or protocols. For example, the communication devices 320 may include wireless communication devices such as a Bluetooth transceiver 321, a Wi-Fi transceiver 322, and a cellular transceiver 323, e.g., a 3G, 4G, LTE or other cellular transceiver.

The electronic device 300 may include one or more output devices 330, which can provide output to the user of the electronic device 300 and to other devices. For example, the output devices 330 may include a screen 331 and/or a speaker 332.

Figure 9:
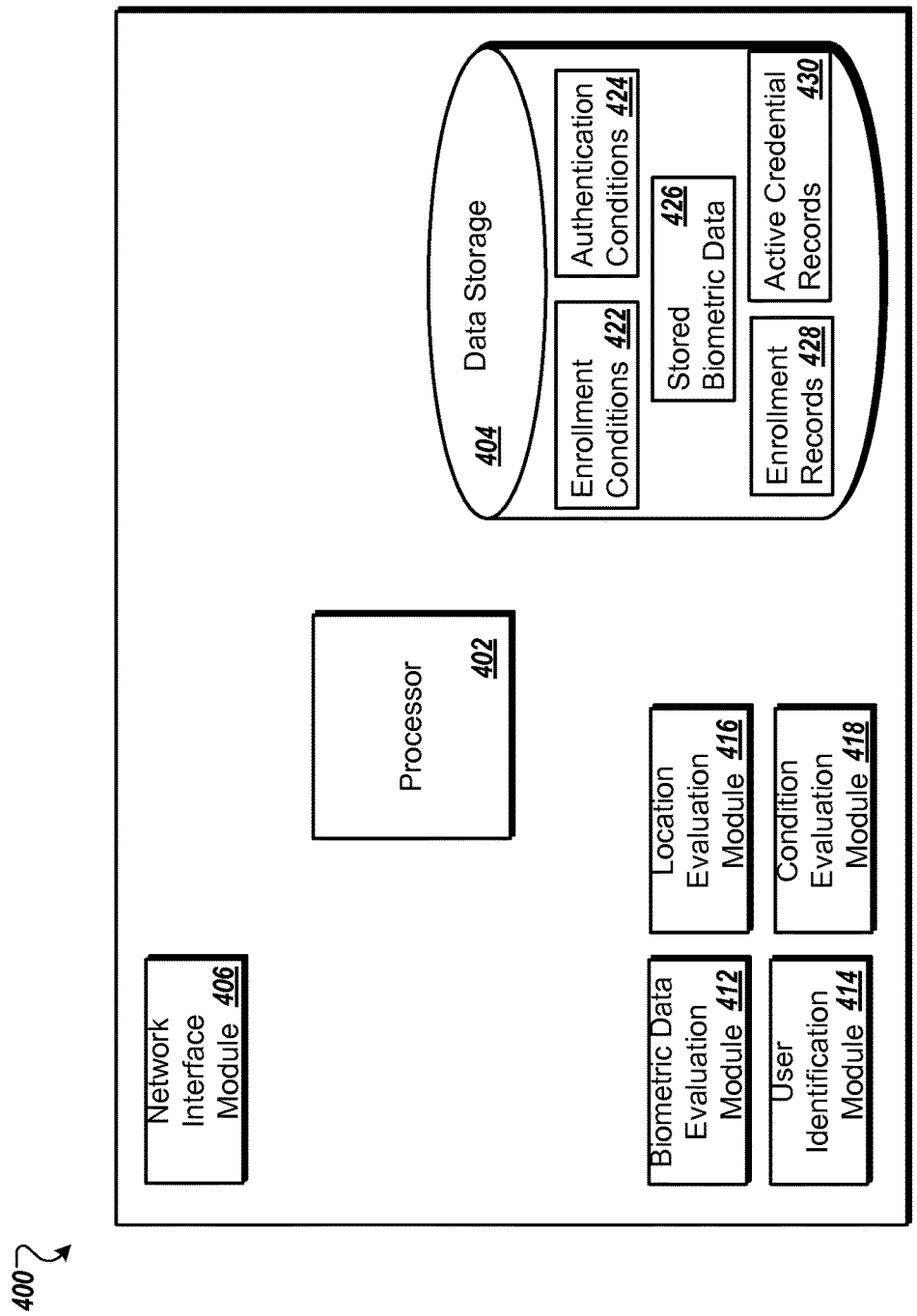
FIG. 9 is a block diagram of an example of a processing system.

FIG. 9 illustrates an example of a computing system 400. The computing system 400 may represent the credential server system 160 of FIG. 5 or the computing system 210 of FIG. 7. The computing system 400 may include one or more processors 402, one or more data storage devices 404, and one or more network interface modules 406.

The computing system 400 may include various processing modules that may be implemented in hardware, software, firmware, or a combination or subcombination thereof. For example, the computing system 400 may include a biometric data evaluation module 412, a user identification module 414, a location evaluation module 416, and/or a condition evaluation module 418.

The one or more data storage devices 404 may include various types of data, such as data indicating enrollment conditions 422, authentication conditions 424, stored biometric data 426, enrollment records 428, and active credential records 420. Various examples of data that may be stored and accessed by computing systems are shown in FIGS. 12 and 27-29.

Figure 10:
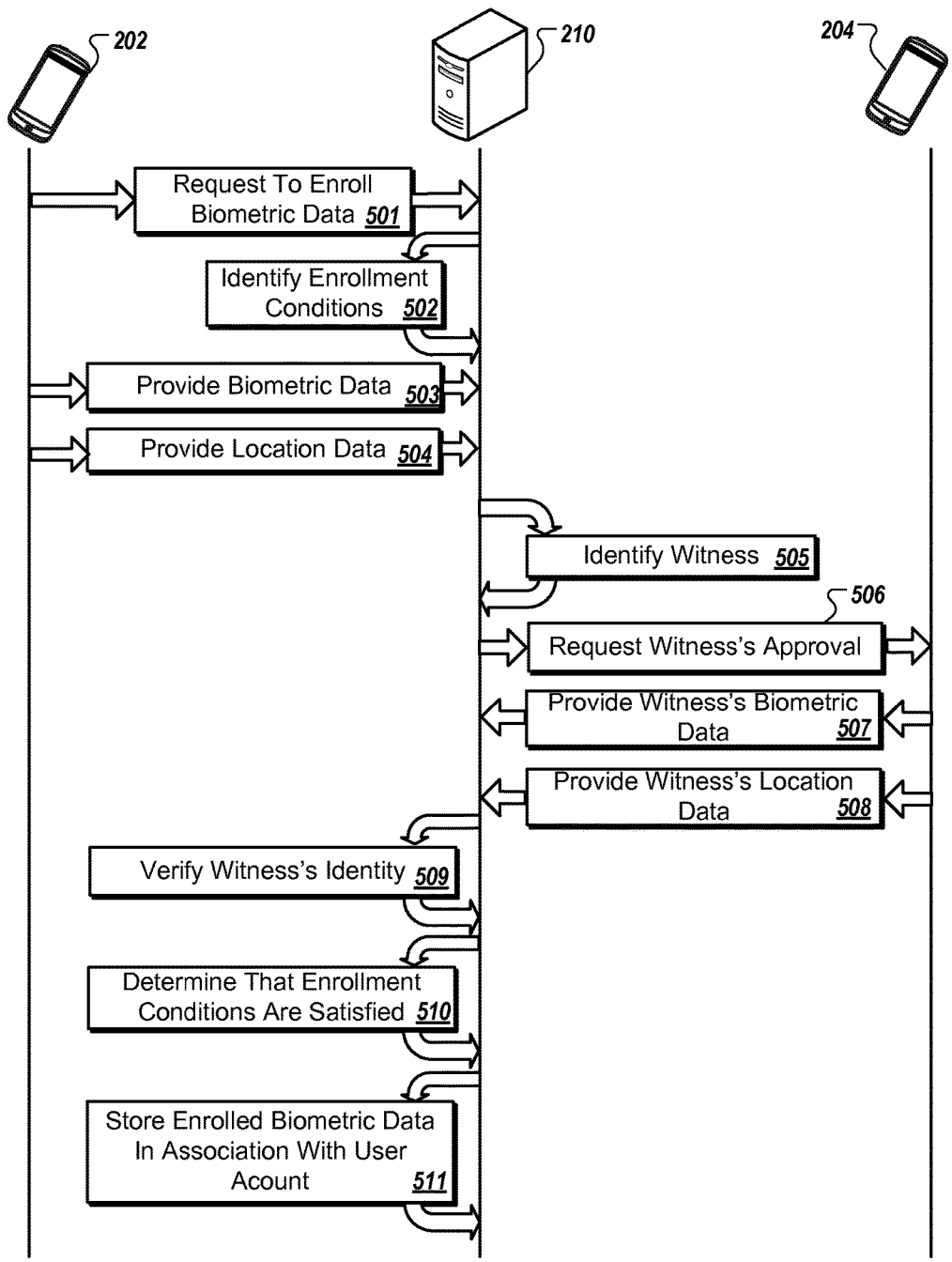
FIG. 10 is a diagram indicating an example of user enrollment

FIG. 10 illustrates an example of actions for enrolling biometric data of a user. The actions may occur in the order shown or in another order. In the example, a first user uses the electronic device 202 to enroll the first user's biometric data for a user account for the first user. A second user, using electronic device 204, serves as a witness to the enrollment. The interactions between the electronic devices 202, 204 and the computing device may each include transferring data over a network, such as the network 230 of FIG. 7.

In the example, a first user requests to enroll biometric data (501). In response to the request, the computing system 210 identifies enrollment conditions (502). The enrollment conditions may include one or more requirements that must be satisfied in order for the first user's biometric data to be enrolled. For example, the enrollment conditions may specify whether the entry of biometric data must be witnessed, who is authorized to serve as a witness, the proximity of the witness, the locations where biometric data may be entered, the times that biometric data may be entered, the devices that may be used to enter biometric data, or a combination of one or more of the above. In the illustrated example, the computing system 210 determines, based on stored data describing the enrollment process, that an authorized witness must be within a predetermined threshold distance of the first user.

The electronic device 202 may prompt the first user to enter biometric data at the electronic device 202. The first user may enter his biometric data, which may include, for example, face image data, eye vein data, iris data, retina data, speech data, fingerprint data, handwriting data, and/or movement data. The electronic device 202 transmits the biometric data to the computing system 210 (503). The electronic device 202 also generates location data indicating the location of the electronic device 202, and transmits the location data to the computing system 210 (504). The location data may include, for example, GPS coordinates, information received by the electronic device 202 in a message from a location beacon, or other location information. The location data may indicate a location of the electronic device 202 at or near the time the first user's biometric data is entered at the electronic device, for example, a location detected within a threshold period of time of detecting the biometric data (e.g., within a minute, within 30 seconds, or within 15 seconds, or within 5 seconds of detecting the biometric data).

The computing system 210 identifies a second user to serve as a witness for the entry of the first user's biometric data (505). In the example, the computing system 210 identifies a second user as being near enough to serve as a witness, based on the location of the second user's electronic device 204. In some implementations, the witness can be identified before biometric data is entered by the first user. For example, the credential application on the electronic device 202 may not permit the first user to enter biometric data until the electronic device 202 is within a threshold distance of the electronic device 204 of an authorized witness, or until the name or other identifier for an authorized witness is provided.

In some implementations, a witness provides user input identifying him or herself as the witness, using his or her electronic device. In some implementations, the computing system 210 receives location data from one or more electronic devices and identifies an electronic device located within a threshold distance of the electronic device 202. In some implementations, the electronic device 202 provides an identifier for the witness, a user account for the witness, a device associated with the witness.

In some implementations, the electronic device 202 may interact with the electronic device 204 using a communication method that has limited range, so that communication using the method demonstrates a particular degree of proximity. For example, one of the electronic devices 202, 204 may use a camera to record an image of a Quick Response (QR) code or other visual code displayed on the screen of the other electronic device 202, 204. As another example, one of the electronic devices 202, 204 may transmit a wireless beacon, such as a Bluetooth or Wi-Fi beacon, that is received by the other electronic device 202, 204. As additional examples, the electronic devices 202, 204 may communicate via infrared, radio-frequency identification (RFID), and various near-field communication (NFC) techniques to transfer information that identifies the witness.

After the second user is identified as a potential witness, the computing system 210 may request that the witness approve the entry of the first user's biometric data (506). The witness may indicate approval by, for example, interacting with an appropriate control on a user interface of a credential application. In some implementations, the witness may indicate approval simply by authenticating or providing evidence that the witness was present to observe the entry of the first user's biometric data. The second user inputs biometric data to the electronic device 204, and the electronic device 204 provides the biometric data to the computing system 210 (507). The electronic device 204 generates location data indicating the location of the electronic device 204 and provides the location data to the computing system 210 (508).

The computing system 210 may use the biometric data to verify the identity of the witness (509). Biometric data of the witness may be required to reduce the likelihood that an imposter pretends to be the second user and falsely approves the enrollment. To verify the second user's identity, the computing system 210 may access biometric data that was enrolled for a user profile of the second user, and compare the received biometric data with the enrolled biometric data. If the characteristics of the two sets of biometric data are similar within a predetermined threshold, the two sets of biometric data can be considered to match, and the second user's identity claim can be accepted.

The computing system 210 determines that enrollment conditions are satisfied (510). In the illustrated example, the computing system 210 determines, based on the location data from the electronic devices 202, 204, that the second user's electronic device 204 is within a threshold distance of the electronic device 202. Thus it may be inferred that the user of the electronic device 202 is physically present and capable of observing the entry of the first user's biometric data. Because the biometric data received from the electronic device 204 matches the enrolled biometric data for the second user, it can be inferred that the second user is the person present at the electronic device 204. Finally, the computing system 210 can determine that the second user is authorized to serve as a witness, for example, based on accessing credential data indicating the second user's credentials. The computing system 210 completes the enrollment of the first user's data by storing enrolled biometric data in association with the first user's user account (511).

If the computing system 210 determines that one or more enrollment conditions are not satisfied, then the biometric data for the first user is not enrolled for the first user's user account. The computing system 210 may send data indicating that enrollment was unsuccessful, and may indicate the reason enrollment was unsuccessful.

In some implementations, the electronic devices 202, 204 may provide the computing system 210 with timestamps or other indications of the times that biometric data or location data is generated. The computing system 210 may determine, for example, that the times the locations are detected correspond to the times the biometric data is entered. For example, a location generated minutes before biometric data is entered may not accurately reflect the actual location where the data entry took place. A location may be likely to accurately represent the location where entry of biometric data occurred if the location is measured within a threshold time period, such as 30 seconds, 10 seconds, or 5 seconds, of entry of the biometric data.

In some implementations, the electronic devices 202, 204 are owned by or are otherwise associated with the first user and the second user. For example, the electronic device 202 may be the phone of the first user, and the electronic device 204 may be the phone of the second user. In some implementations, the electronic devices 202, 204 are not owned by or associated with the first user and second user. In some implementations, actions performed by the electronic devices 202, 204 may be performed by a single device, such as a single phone, computer system, or kiosk, or may be performed by more than two devices. For example, the first user and the second user may both use a single kiosk in a fixed location, or a computer system in an office, rather than use two different electronic devices 202, 204 to enter biometric data and perform the other actions shown in FIG. 10.

In some implementations, one or more devices may be used to act as witness to verify an enrollment, in addition to or instead of a human witness. For example, instead of a human witness, a monitoring device may observe the entry of data by the first user and provide data that the computing system 210 may use to determine whether proper enrollment procedures were followed by the first user. The monitoring device may be in a fixed location or may be mobile. The monitoring device may be one that has been designated as trusted by the computing system 210, and the monitoring device may provide data to the computing system 210 in a secure manner. Examples of devices that may be used as monitoring devices for witnessing an enrollment include a computer system, a kiosk, a camera, a wall panel, and other devices having sensors or input mechanisms.

In some implementations, in step (505), rather than identifying a human witness, the computing system 210 can identify one or more suitable monitoring devices near the first user. The identified device may be, for example, trusted by the computing system 210 and capable of detecting the appropriate conditions or parameters needed for a proper enrollment. The monitoring device may interact with the first user's electronic device 202 just as an electronic device 204 of another user would in the manner described above. In step (506), the computing system 210 may send a request or instruction causing the identified monitoring device to detect the needed parameters, such as video, audio, movement, etc. When the monitoring device is trusted by the computing system 210, steps (507) and (509) may be omitted, since the trusted status of a monitoring device may make further confirmation of the identity of the device unnecessary. Alternatively, in step (507) the monitoring device may provide an identifier, code, key, or other verification data that confirms the identity of the device or that the data from the device can be trusted, and this data may be checked for authenticity against stored data by the computing system in step (509).

At any time, the computing system 210 may request verification data from the monitoring device to verify the identity or trusted status of the monitoring device, or to establish that monitoring data received by the computing system 210 has not been falsified or provided from an unauthorized source. In step (508), the monitoring device may provide the location of the monitoring device to the computing system 210, or the computing system 210 may access data from another source that indicates the location of the monitoring device. For example, if the monitoring device is in a fixed location, the computing system 210 may access previously stored data indicating the location of the monitoring device. At any time during the enrollment process, the monitoring device may send data that the computing system 210 can use to verify whether appropriate enrollment conditions are met. For example, the monitoring device may send image or video data, and the computing system 210 may use face recognition or other techniques to verify that an image from the monitoring device shows the same face as the one submitted by the first user using the electronic device 202.

Figure 11:
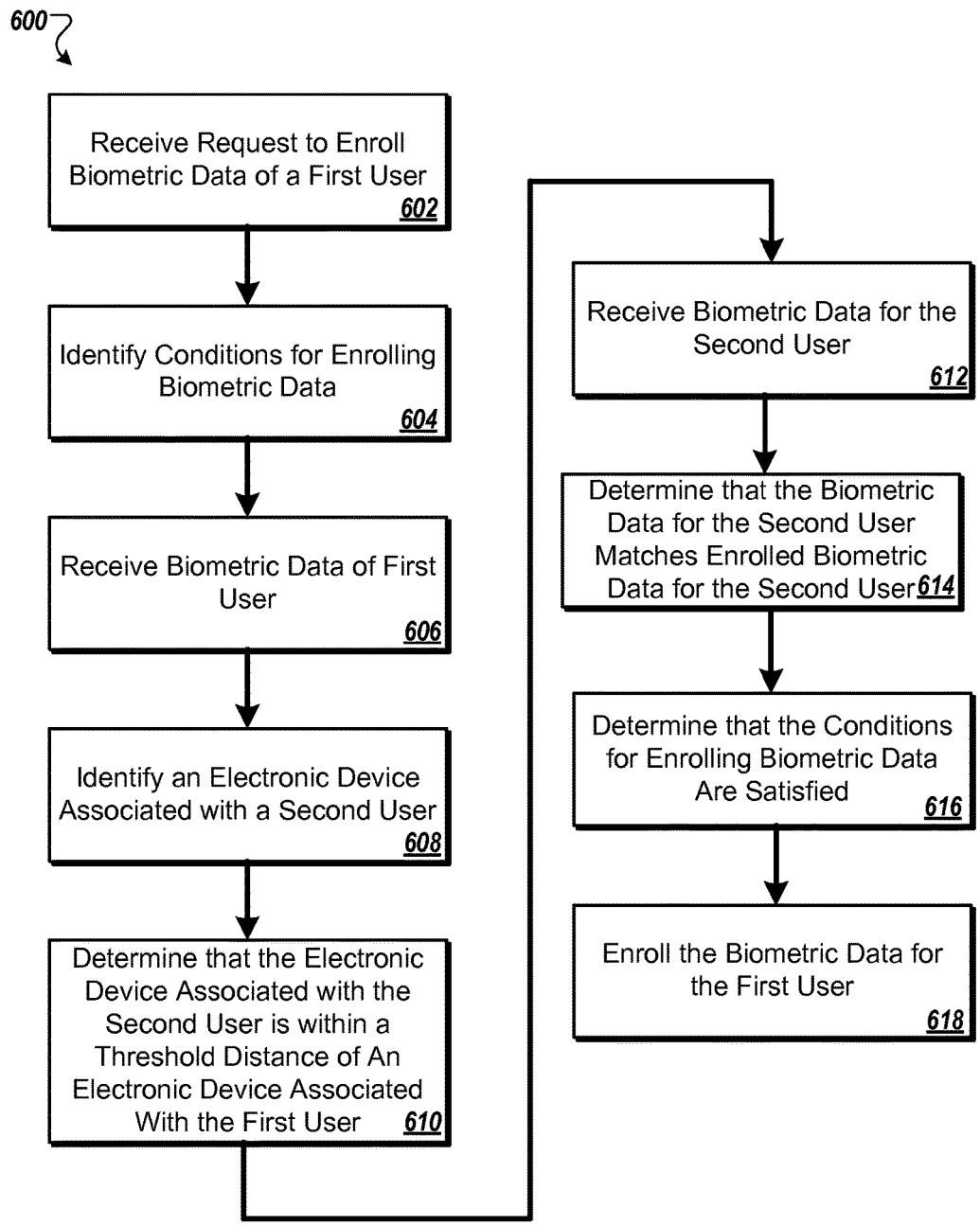
FIG. 11 is a flow diagram for an example process of user enrollment.

FIG. 11 illustrates an example of a process 600 for enrolling data for a user account. The process 600 is described as being performed by the computing system 210, but may additionally or alternatively be performed by another computing system or combination of computing systems.

The computing system 210 receives a request to enroll biometric data for a user account of a first user (602). For example, a first user may access a credential application and access an interface for receiving the first user's biometric data.

The computing system 210 identifies one or more conditions for enrolling biometric data for the user account of the first user (604). The one or more conditions may include a requirement that a witness being located within a threshold distance of the first user during entry of biometric data that the first user is requesting to enroll. Additional conditions, or different conditions, may be placed on enrollment of biometric data. For example, a condition may require a witness to possess a particular credential. As another example, a condition may require enrollment to occur at a particular geographical location, such as a particular building, floor, or room, or within a particular range of time. As another example, a condition may require biometric data to be entered at a particular device, such as at a kiosk in one of various locations, or at a particular type of device, such as a device having certain hardware capabilities or running certain software. As another example, a condition may require enrollment to occur under observation of monitoring equipment, such as a video camera.

The computing system 210 receives first biometric data representing one or more biometric identifiers of the first user (606). The first biometric data may be received from a first electronic device associated with the first user. For example, the first electronic device may detect the biometric input, e.g., by recording speech, capturing an image with a camera, reading a fingerprint, etc., and may provide the biometric input or data extracted from the biometric input to the computing system 210 over a network. The first biometric data may include any appropriate biometric identifier for the first user, and may include biometric identifiers of multiple different types. For example, the first biometric data may include one or more of face image data, eye vein data, iris data, retina data, speech data, fingerprint data, handwriting data, or movement data.

The computing system 210 identifies a second electronic device associated with a second user that is to serve as the witness of entry of biometric data that the first user is requesting to enroll (608). In some implementations, the computing system 210 receives input from the first electronic device or second electronic device that identifies the second user. For example, the second user may indicate, through an application on the second electronic device that is in communication with the computing system 210, that the second user will serve as the witness. As another example, the first user may enter the name of the second user at the first electronic device, and the first electronic device may send the name to the computing system 210.

The computing system 210 determines that the second electronic device is within the threshold distance of the first electronic device (610). The computing system 210 receives location data indicating the locations of the first electronic device and the second electronic device. The location data may include, for example, one or more of GPS coordinates, data indicating communication with location beacons, data indicating direct communication of the first and second electronic devices through a short-range communication channel, or other data. For example, the computing system 210 may use location data to determine a distance between the first electronic device and the second electronic device, and then compare the distance to the threshold distance. As another example, the location data may indicate that the first electronic device and the second electronic device received a beacon message from the same location beacon, and thus that the electronic device are both within certain distance thresholds of the location beacon. Since the electronic devices are within a known distance of the location beacon, the computing system 210 may determine that the electronic devices are within the threshold distance of each other.

In some implementations, the computing system 210 identifies the second user as a witness based on location data. For example, the computing system 210 may identify one or more electronic devices that are in communication with the computing system 210. From this set of devices, the computing system 210 may determine which devices are associated with a user authorized to be a witness, e.g., by being registered with a user account of a potential witness or having a potential witness logged in at the device. From the subset associated with a user authorized as a witness, which are also within a particular distance threshold from the first electronic device, the computing system 210 may select, for example, the closest electronic device to the first electronic device or may select multiple electronic devices. The users of the selected device or devices may then be witnesses or may be asked to serve as witnesses. Thus, the second user may be identified without user input from the first user or second user specifying which user will be the witness.

The computing system 210 receives second biometric data representing one or more biometric identifiers of the second user (612). In some implementations, the computing system 210 sends a message to the second electronic device requesting biometric data from the second user, and the second biometric data is received in response. The second biometric data may be received from the second electronic device associated with the second user. For example, the second electronic device may detect the biometric input, e.g., by recording speech, capturing an image with a camera, reading a fingerprint, etc., and may provide the biometric input or data extracted from the biometric input to the computing system 210 over a network. The second biometric data may include any appropriate biometric identifier for the second user, and may include biometric identifiers of multiple different types. For example, the second biometric data may include one or more of face image data, eye vein data, iris data, retina data, speech data, fingerprint data, handwriting data, or movement data. The second biometric input may include a biometric identifier for each of multiple different biometric identification modalities, to permit multi-factor biometric authentication of the second user.

The computing system 210 determines that the second biometric data matches biometric data enrolled for a user account of the second user (614). For example, the computing system 210 accesses stored biometric data that was previous enrolled for the user account of the second user. The computing system 210 may evaluate the received biometric data for the second user against the stored biometric data enrolled for the user account of the second user. The evaluation may indicate, for example, that a degree of similarity between the received biometric data and the stored biometric data is within a threshold level, and thus that the received biometric data matches the stored biometric data.

The computing system 210 determines that the one or more conditions are satisfied (616). For example, the determination may be made based on determining that the second electronic device is within a threshold distance of the first electronic device and determining that the second biometric data matches biometric data enrolled for a user account of the second user.

In response to determining that the one or more conditions are satisfied, the computing system 210 stores, in electronic storage, account data that enrolls the first biometric data for the user account of the first user (618).

In some implementations, if the computing system 210 determines that the one or more conditions are not satisfied, biometric data is not enrolled. The computing system 210 may provide data to the electronic device of the first user, or to another device, indicating that enrollment was not completed. The computing system 210 may provide data indicating the reason that enrollment did not succeed, e.g., by identifying the condition that was not satisfied. As an example, if the second user's biometric data does not match the stored biometric data enrolled for the user account of the second user, enrollment of the first user's biometric data may be disallowed. As additional examples, enrollment may be disallowed if no electronic device associated with a user authorized to be a witness is detected, or if the electronic device of a witness is located at a distance greater than the threshold distance from the first electronic device.

In some implementations, the witness may be required to provide input confirming that the second user witnessed the first user entering the first biometric data. The computing system may transmit a request for confirmation to the second electronic device and then receive confirmation data indicating user input confirming that the second user witnessed the first user entering biometric identifiers in response to the request. The confirmation data may be used to determine whether the conditions for enrollment are satisfied.

The one or more conditions may include a condition that entry of the biometric data must occur within a predetermined geographical region. The computing system may receive location data indicating a location of the first electronic device, and determine, based on the location data, that the first electronic device is located within the predetermined geographical region to determine whether the condition is satisfied.

In some implementations, the one or more conditions indicate that the witness must possess a particular credential. The computing system 210 may access credential data indicating credentials associated with a user account of the second user, and determine, based on the credential data, that the second user possesses the particular credential required to be a witness.

In some implementations, the computing system 210 the one or more conditions indicate that authentication by the witness must occur within a predetermined period of time of capture of the biometric data of the first user. The predetermined period of time may be a range of time before entry of the first user's biometric data, after the first user's biometric data, or extending before and after entry of the first user's biometric data. The computing system 210 may determine a first time that the first biometric data was captured, determine a second time that the second biometric data was captured, determine a period of time between the first time and the second time, and determine that the period of time is within the predetermined period of time.

In some implementations, the location data is required to reflect locations within a predetermined period of time of the input of biometric data. For example, the computing system 210 may receive data indicating a time that the first biometric data was detected by the first electronic device and receive data indicating a time that location data for the first and second electronic devices was generated. The computing system 210 may determine a period of time between the time that the first biometric data was detected and a time that the location data was generated, and determine that the period of time satisfies a threshold. Determining that the one or more conditions are satisfied can include determining that the period of time satisfies the threshold.

FIG. 12 illustrates an example of a table 700 indicating various security or trust levels for different users and enrolled biometric identifiers. In some implementations, different enrollment procedures may be used to enroll biometric identifiers at different security levels. The computing system 210 may store and access data similar to the data shown in the table 700 to limit access according to the degree to which the enrolled biometric data can be trusted. The table 700 includes various records, e.g., rows, where each record indicates a user identifier 702, a type of biometric identifier 704, and the security level of enrollment 706 for the biometric identifier.

Data enrolled at different security levels may be trusted to different degrees. Different enrollment conditions may apply for each security level. For example, a first set of enrollment conditions may be required to be satisfied in order to enroll biometric identifiers at a first security level. A second, different set of enrollment conditions may be required to be satisfied in order to enroll biometric identifiers at a second security level. Higher security levels may require enrollment to occur in more controlled environments. For example, enrollment at a security level of "1" may require only that biometric data be entered at a particular building. Enrollment at a security level of "2" may require that biometric data be entered at the particular building and in the presence of a witness. Enrollment at a security level of "3" may require that biometric data be entered in the particular building, in the presence of witness that provides at least two different forms of biometric identification.

The security levels may correspond to different levels of access. For example, A security level of "1" may provide the least access, a security level of "2" may provide increased access, and so on. A user that authenticates based on an enrolled biometric identifier of security level "2" may have greater access privileges than a user that authenticates based on an enrolled identifier of security level "1."

Figure 13:
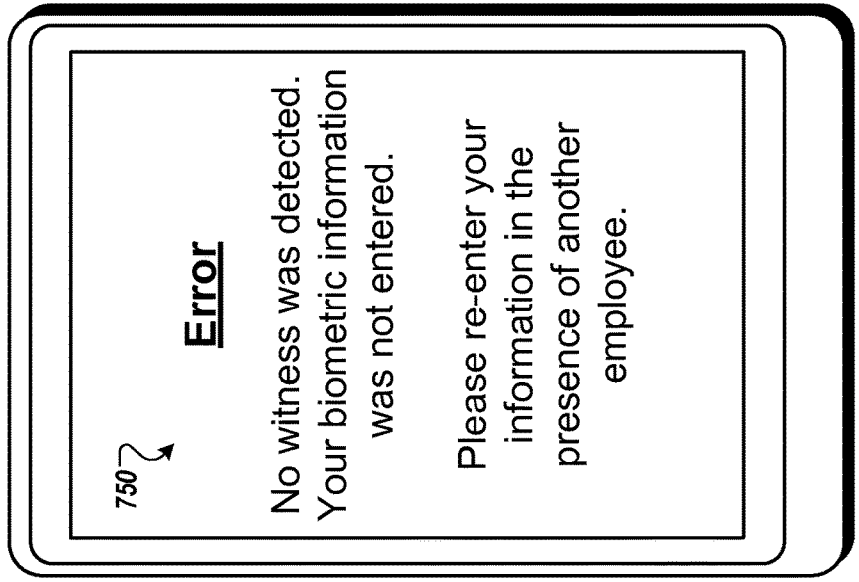

FIG. 13 illustrates an example of a user interface 750 indicating that an enrollment attempt was unsuccessful. In the example, the presence of a witness was required for enrollment. However, the electronic device of a suitable witness was not detected. As a result, the biometric data that the user attempted to enroll was not associated with the user's account.

Figure 14:
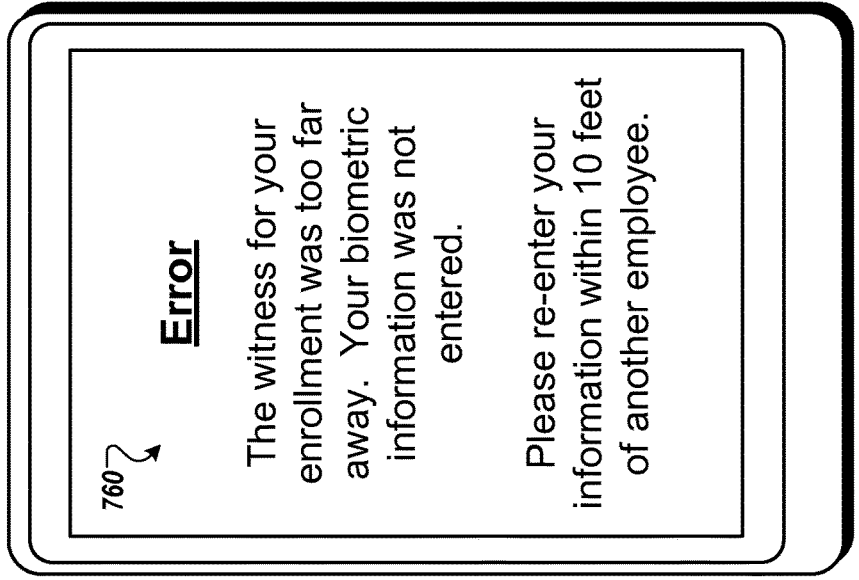
FIGS. 13 and 14 are examples of user interfaces indicating unsuccessful enrollment.

FIG. 14 illustrates an example of a user interface 760 indicating that an enrollment attempt was unsuccessful. In the example, the presence of a witness was required for enrollment. The electronic device of a potential witness was detected, but the location of the witness's electronic device could not be verified as being within a predetermined distance threshold that is a condition for enrollment. Because the witness was too far away, e.g., not within a required 10-foot threshold, the biometric data that the user attempted to enroll was not associated with the user's account.

Although the examples of FIGS. 13 and 14 indicate that enrollment was unsuccessful for lack of a proper witness, enrollment may be denied for other reasons. In some implementations, a human witness is not required, and other measures may be used to control at least some aspects of the environment in which biometric data is enrolled.

FIGS. 15-20 illustrate an example of authenticating a user. In the example, the environment in which biometric data is entered is required to meet one or more conditions. For example, the entry of biometric data used for authentication must be witnessed by another user. In the example, a user is authenticating in order to activate a credential. Controlled authentication may be used when performing any of a variety of actions related to a credential, including, for example, obtaining, transferring, renewing, or using a credential.

Figure 15:

In FIG. 15, a credential application running on the electronic device 102 provides a user interface 800 for activating a credential. The user interface 800 prompts a user, e.g., Sam, to authenticate using biometric data in order to activate a credential. In the example, the credential is access badge functionality of the credential application that provides access to an office building. Although Sam is trusted with access to the building, the credential has expired and Sam needs to authenticate in order to regain access. The user interface indicates that Sam may activate the access badge feature by entering a face image and speaking the digits indicated.

In some implementations, a badge or other credential may expire at the end of a time period or after another condition occurs. A credential may expire at the end of each day, for example, so that a stolen phone or other device with the credential could not permit access the next day. If the credential expires at the end of each day, authorized users may be required to authenticate at the beginning of each day to renew and reactivate the credential. An imposter with a stolen phone or other device would likely not be able to provide the biometric input corresponding to the phone's owner, and so would be unlikely to be able to renew the credential. Further, even if the imposter had a recording of the owner's voice or means to falsify a biometric input, authentication conditions, such as the requirements of a witness being present or restrictions on the time and place that authentication must occur, decrease the likelihood that an imposter could successfully enter false biometric data.

Figure 16:
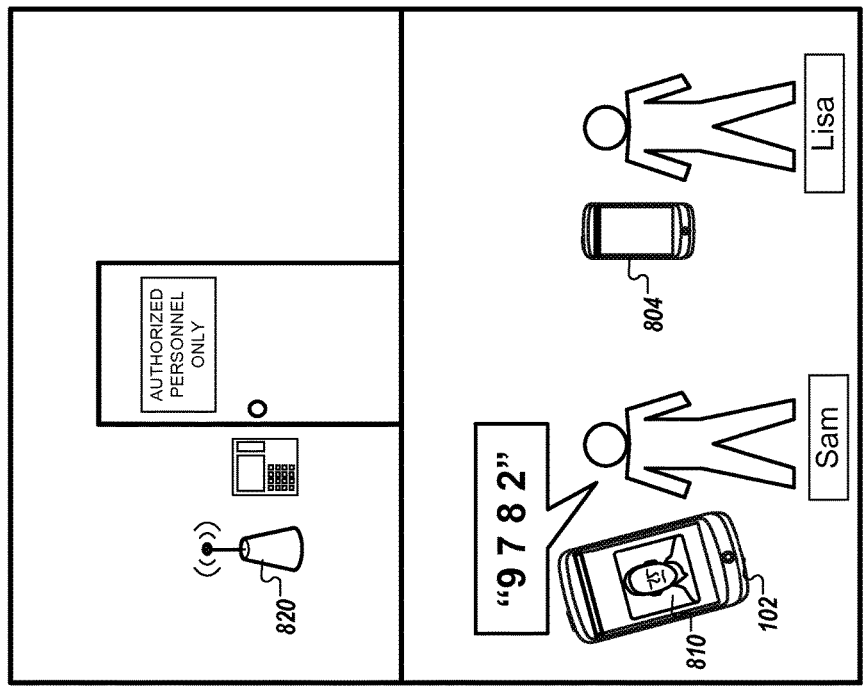
FIGS. 15-20 are diagrams of an example of authentication under predetermined conditions.

In FIG. 16, the user who is attempting to authenticate enters biometric data. In the example, Sam enters his biometric data at the electronic device 102 by capturing a face image 810 and speaking the digits indicated by the user interface 800. The electronic device 102 sends the biometric data, e.g., the face image 810 and voice recording or data extracted from the face image 810 and voice recording, to the credential server system associated with the credential application.

While Sam enters his biometric data, another employee, Lisa, is nearby and has an electronic device 804, e.g., Lisa's phone. Credential applications on both of the electronic devices 102, 804 communicate with a credential server system, and provide location data indicating the respective locations of the electronic devices 102, 804. The location data may be determined based on interaction of the electronic devices 102, 804, which may provide evidence that the electronic devices 102, 804 are within a threshold distance of each other. In addition, or as an alternative, the electronic devices 102, 804 may interact with a location beacon 820 and may, for example, receive a beacon message including an identifier or code that indicates a location. In addition or as an alternative, the electronic devices 102, 804 may determine their locations using GPS receivers.

Using the location data, the credential server system identifies the electronic device 804 as being in a location where the owner, Lisa, could serve as a witness for the authentication. The credential server system requests that Lisa approve the biometric data that Sam entered.

Figure 17:
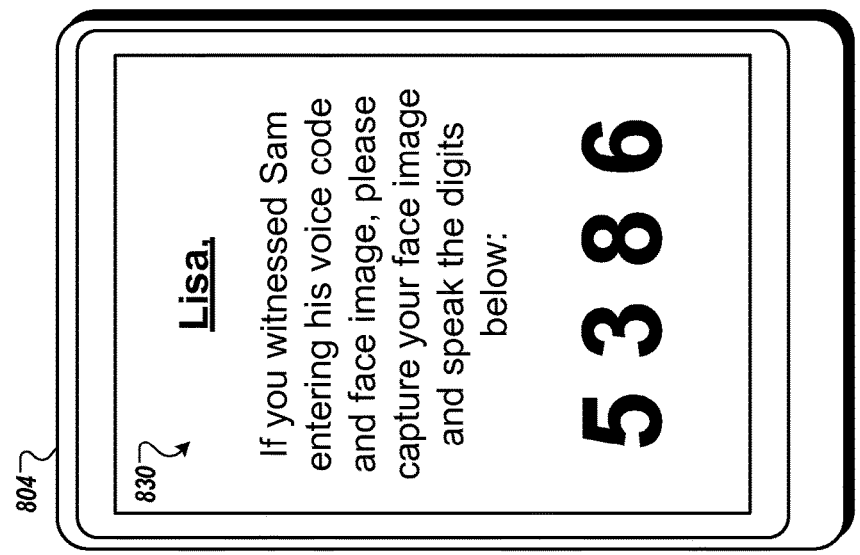

FIG. 17 illustrates an example of a user interface 830 requesting a witness to authenticate using biometric data to approve the entry of biometric data of another user. The user interface directs Lisa to capture a face image of herself and to record a sample of her speech, to authenticate herself as the witness to Sam's authentication.

Figure 18:
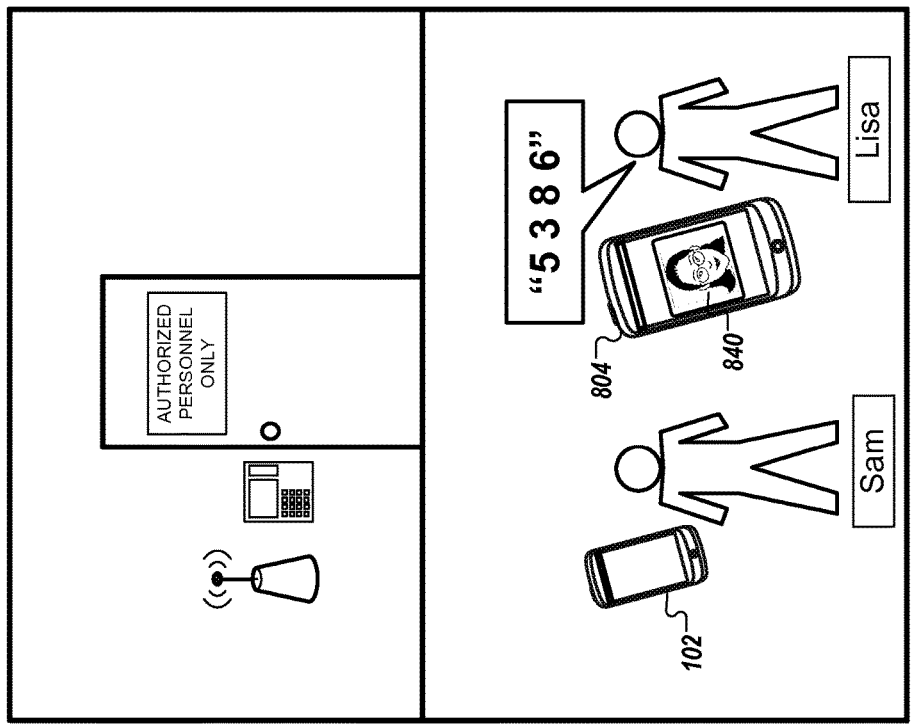

In FIG. 18, the witness, Lisa, enters her biometric data at the electronic device 804. Lisa speaks the digits indicated on the user interface 830 and captures a face image 840. The electronic device 804 sends the biometric data, e.g., the face image 840 and voice recording or data extracted from the face image 840 and voice recording, to the credential server system.

The credential server system uses the biometric data and location data received from the electronic devices 102, 804 to determine whether the conditions required for Sam's authentication have been satisfied. For example, the credential server system compares Sam's biometric data with Sam's previously enrolled biometric data, and determines that the two sets of biometric data match. The credential server system also compares Lisa's biometric data with Lisa's previously enrolled biometric data, and determines that the two sets of biometric data match. Thus, since two forms of biometric data match for each of Sam and Lisa, it is likely that the users of the electronic devices 102, 804 are actually Sam and Lisa. As indicated above, the credential server system also determined, based on location data from the electronic devices 102, 804, that the electronic devices 102, 804 are within the threshold distance required for by the authentication conditions. As a result, the credential server system determines that the authentication conditions are satisfied, and the credential server system renews Sam's credential.

Figure 20:
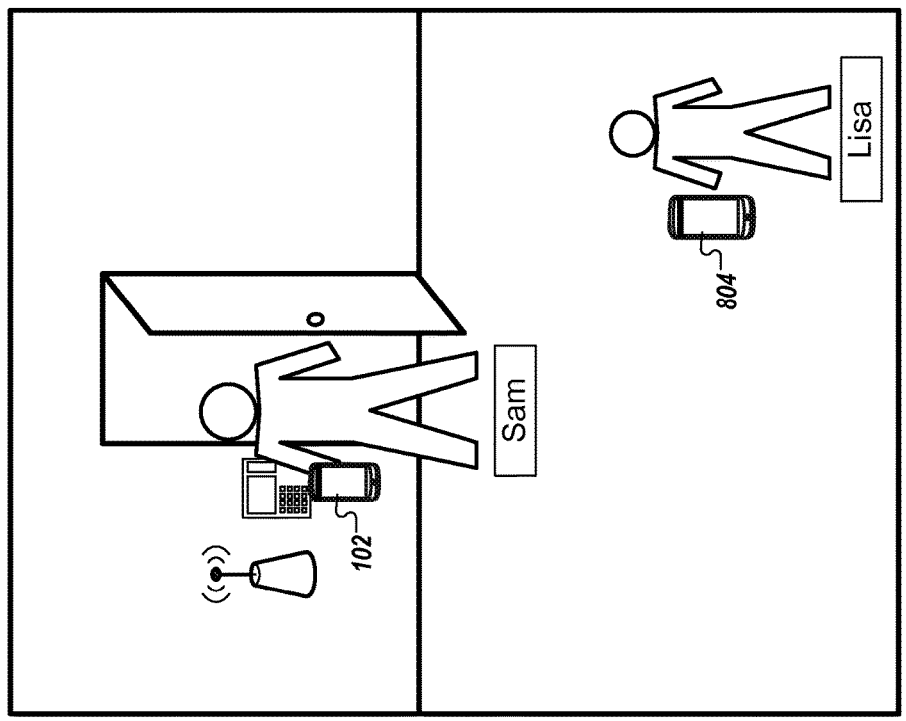
Figure 19:
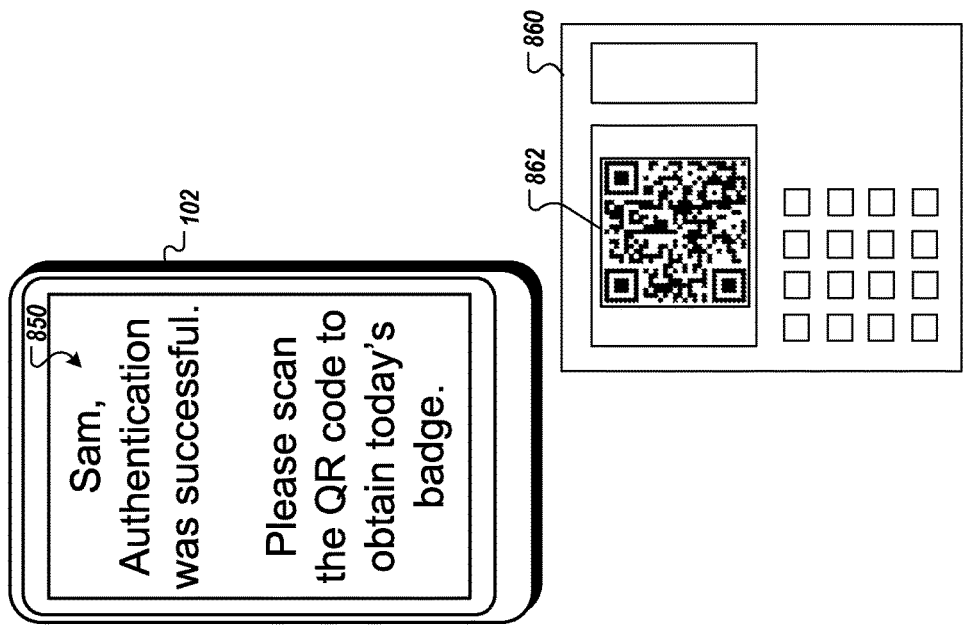

In FIG. 19, the credential application on the electronic device 102 provides a user interface 850 indicating that authentication is successful. The user interface 850 also provides instructions for making the credential active on the electronic device 102. For example, the credential server system may cause a device 860 to display a QR code 862 or provide other output that causes the credential to become usable at the electronic device 102. In FIG. 20, Sam uses the renewed credential on the electronic device 102 to gain access to a location with controlled access, such as a locked room.

In some implementations, the credential server may provide data over a network that causes the electronic device 102 to be able to use the credential. Accordingly, a user action such as scanning a QR code may not be necessary, and the credential may be activated on the electronic device 102 without further user action.

In some implementations, the credential server system renews the credential by updating credential data at the server. Access control devices may be connected to the credential server system through a network. When Sam attempts to use the credential at an access control device, and the credential server system determines that the electronic device 102 is present at the access control device, the credential server system may instruct the access control device to provide access. The credential server system may continue to provide access based on the credential until the credential server system determines that the credential has expired.

If Sam's authentication had been unsuccessful, for example, due to the lack of a witness, a witness being too far away, or a mismatch between the received biometric data and enrolled biometric data for Sam or for the witness, the credential application would provide a user interface indicating that authentication was unsuccessful. Sam's credential would not be renewed until he successfully authenticated by meeting the appropriate conditions on entry of his biometric data.

Figure 21:
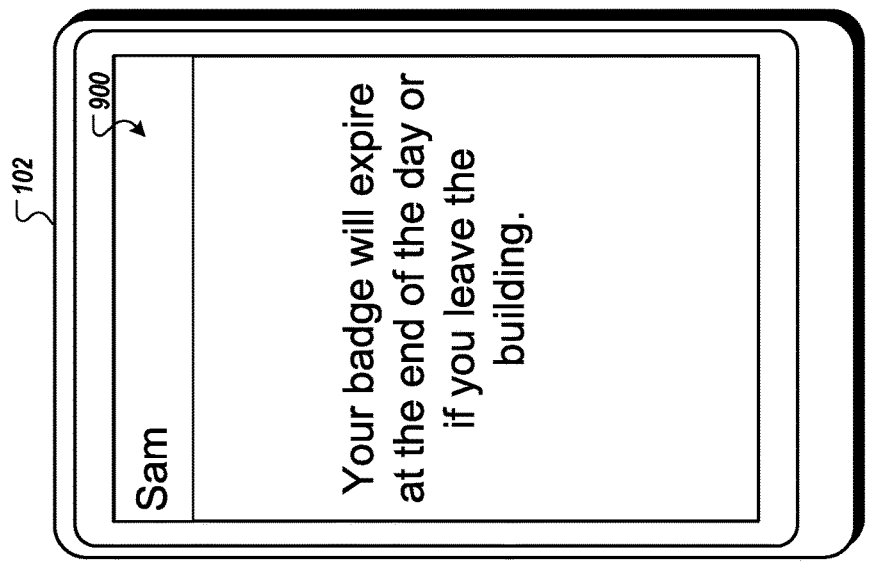

FIG. 21 illustrates an example of a user interface 900 indicating expiration conditions for a credential. To limit the potential for misuse of a credential by an imposter, one or more expiration conditions may be set. When one of the expiration conditions occurs, the credential application on the electronic device 102 and/or the credential server system may cause the credential to be unusable until the associated user authenticates by entering biometric data in the manner specified by the authentication conditions.

In the illustrated example, the user interface 900 indicates that Sam's access badge credential will expire at the end of the day. The user interface 900 also indicates that the credential will expire if Sam leaves the building. The credential application on the electronic device 102 may monitor the location of the electronic device 102. If the electronic device 102 detects that it is at a location outside the building, the credential application can notify the credential server system and the credential will be disabled.

Figure 22:
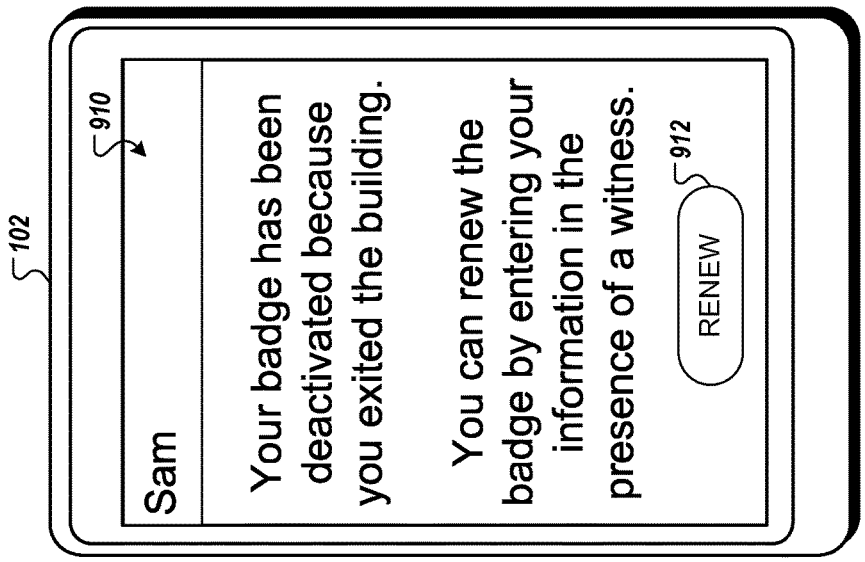

FIG. 22 illustrates an example of a user interface 910 for indicating that a credential has been disabled. In the example, Sam's credential has been deactivated because the electronic device 102 was taken outside the building. The user interface 910 includes a renewal control 912 that can be used to initiate the authorization process. If Sam took the electronic device 102 out of the building, Sam will be able to re-authenticate and renew his credential when he returns to the building. If an imposter has stolen the electronic device 102, however, the imposter will likely be unable to authenticate with Sam's biometric information under the required authentication conditions. As a result, an imposter is unlikely to be able to renew the credential and gain improper access using the credential.

FIG. 23 illustrates an example of a user interface 920 for indicating that a credential has been disabled. In the example, Sam's credential was active for only a predetermined time period. The credential has been deactivated because the time period has ended. The user interface 920 includes a renewal control 922 for renewing or reactivating the credential, and Sam may regain the ability to use the credential by repeating the authorization process associated with the credential.

FIG. 24 illustrates an example of a user interface 930 for indicating that a credential is unavailable. In some instances, data that is needed to verify whether a credential should be active may not be available. For example, the ability to use a credential may be conditioned on the electronic device 102 being in a particular geographical area. If features for determining the location of the electronic device 102 are disabled, then it may be difficult to accurately determine whether the credential should be enabled or disabled. In some implementations, if the credential application on the electronic device 102 determines that location data or other needed data is unavailable, the credential application may temporarily disable the credential until appropriate data is obtained. The credential application on the electronic device 102 may refuse to permit use of the credential, for example, by not providing codes needed to access resources, or by not providing identifiers needed to identify the electronic device 102 or the user.

When the appropriate data is obtained, if the location data or other data indicates that the credential should still be active, the credential application may automatically restore access to the credential. Alternatively, if the location data or other data indicates that the credential should expire, the credential may be disabled.

In some implementations, the credential server system generally determines when expiration conditions occur. However, the credential application on the electronic device 102 may additionally or alternatively assess whether expiration conditions have occurred and may take action to disallow use of a credential. For example, if the electronic device 102 does not have access to a network and cannot communicate with the credential server system, the credential application may disable a credential when expiration conditions occur. The expiration conditions may be stored on the electronic device 102 to facilitate this functionality.

Figure 25:
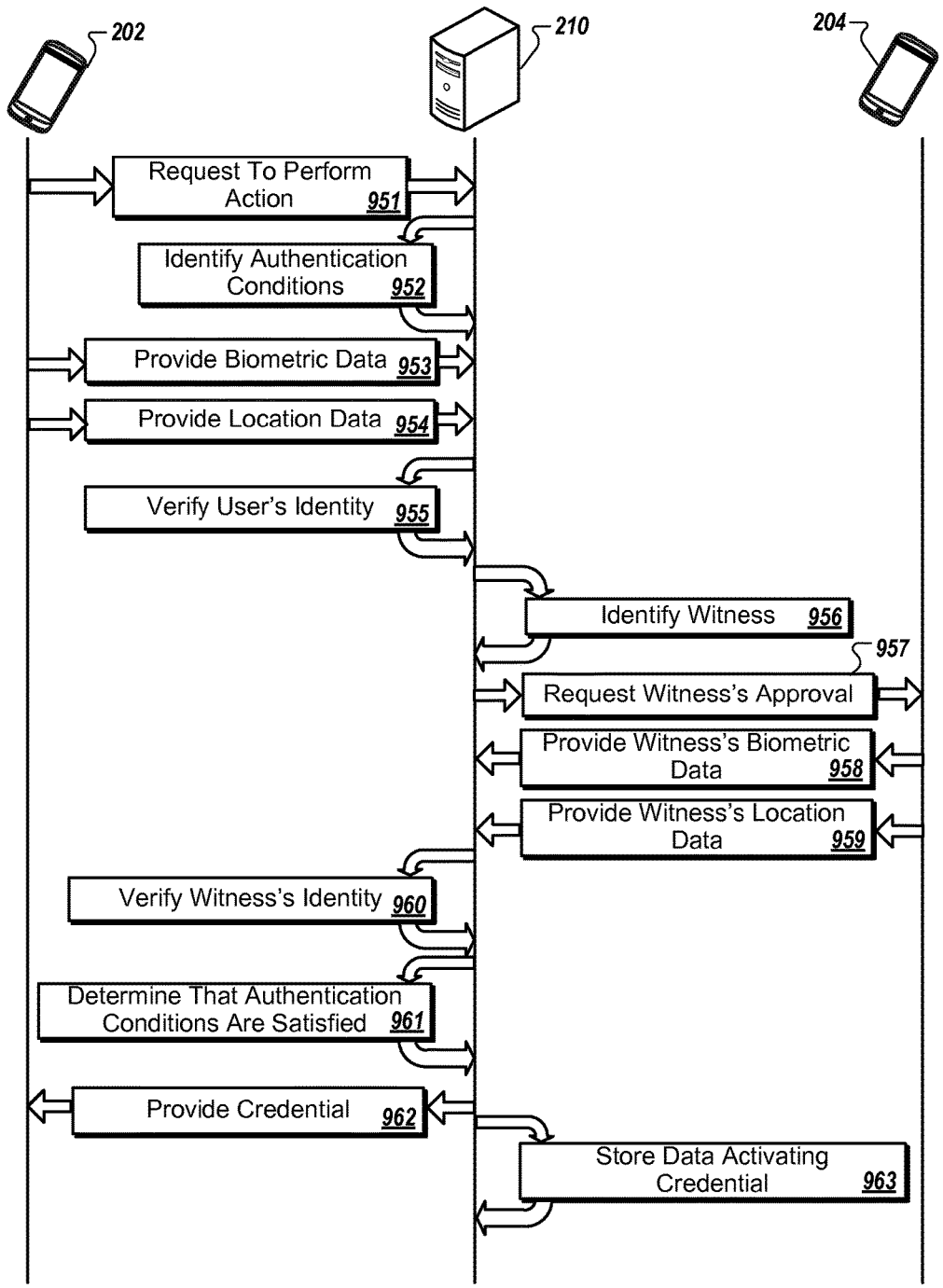
FIG. 25 is a diagram of an example of user authentication.

FIG. 25 illustrates an example of actions for authenticating a user. The actions may occur in the order shown or in another order. In the example, a first user uses the electronic device 202 to request that an action be performed related to a credential, for example, to request that a credential be activated, renewed, or transferred. The requested action requires authentication of the first user under a set of authentication conditions that specify how biometric data of the first user must be entered. A second user, using the electronic device 204, serves as a witness to the entry of the first user's biometric data and assists in authentication of the first user. The interactions between the electronic devices 202, 204 and the computing device may each include transferring data over a network, such as the network 230 of FIG. 7.

In the example, a first user requests to perform an action related to a credential (951). For example, the first user may attempt to use a credential, e.g., to gain access to a secured location or resource. As another example, the first user may request that an expired credential be renewed. As another example, the first user may attempt to obtain a new credential, or transfer a credential to a device.

In response to the request, the computing system 210 identifies authentication conditions (952). The authentication conditions may include one or more requirements that must be satisfied in order for the first user's biometric data to be able to result in a valid authentication. For example, the authentication conditions may specify whether the entry of the first user's biometric data must be witnessed, who is authorized to serve as a witness, the proximity of the witness, the locations where biometric data may be entered, the times that biometric data may be entered, the devices that may be used to enter biometric data, or a combination of one or more of the above. In the illustrated example, the computing system 210 determines, based on stored data describing the conditions for authenticating the first user, that an authorized witness must be within a predetermined threshold distance of the first user.

The electronic device 202 may prompt the first user to enter biometric data at the electronic device 202. The first user may enter his biometric data, which may include, for example, face image data, eye vein data, iris data, retina data, speech data, fingerprint data, handwriting data, and/or movement data. In some implementations, the first user must enter two or more types of biometric data. The electronic device 202 transmits the biometric data to the computing system 210 (953).

The electronic device 202 also generates location data indicating the location of the electronic device 202, and transmits the location data to the computing system 210 (954). The location data may include, for example, GPS coordinates, information received by the electronic device 202 in a message from a location beacon, or other location information. The location data may indicate a location of the electronic device 202 at or near the time the first user's biometric data is entered at the electronic device, for example, a location detected within a threshold period of time of detecting the biometric data (e.g., within a minute, within 30 seconds, or within 15 seconds, or within 5 seconds of detecting the biometric data).

The computing system 210 may use the biometric data to verify the identity of the first user (955). Biometric data of the witness may be required to reduce the likelihood that an imposter pretends to be the second user and falsely approves the entry of data used for authentication of the first user. To verify the second user's identity, the computing system 210 may access biometric data that was enrolled for a user profile of the second user, and compare the received biometric data with the enrolled biometric data. If the characteristics of the two sets of biometric data are similar within a predetermined threshold, the two sets of biometric data can be considered to match, and the second user's identity claim can be accepted.

The computing system 210 identifies a second user to serve as a witness for the entry of the first user's biometric data (956). In the example, the computing system 210 identifies a second user as being near enough to serve as a witness, based on the location of the second user's electronic device 204. In some implementations, the witness can be identified before biometric data is entered by the first user. For example, the credential application on the electronic device 202 may not permit the first user to enter biometric data until the electronic device 202 is within a threshold distance of the electronic device 204 of an authorized witness, or until the name or other identifier for an authorized witness is provided.

In some implementations, a witness provides user input identifying him or herself as the witness, using his or her electronic device. In some implementations, the computing system 210 receives location data from one or more electronic devices and identifies an electronic device located within a threshold distance of the electronic device 202. In some implementations, the electronic device 202 provides an identifier for the witness, a user account for the witness, a device associated with the witness.

In some implementations, the electronic device 202 may interact with the electronic device 204 using a communication method that has limited range, so that communication using the method demonstrates a particular degree of proximity. For example, one of the electronic devices 202, 204 may use a camera to record an image of a QR code or other visual code displayed on the screen of the other electronic device 202, 204. As another example, one of the electronic devices 202, 204 may transmit a wireless beacon, such as a Bluetooth or Wi-Fi beacon, that is received by the other electronic device 202, 204. As additional examples, the electronic devices 202, 204 may communicate via infrared, RFID, and various NFC techniques to transfer information that identifies the witness.

After the second user is identified as a potential witness, the computing system 210 may request that the witness approve the entry of the first user's biometric data (957). The witness may indicate approval by, for example, interacting with an appropriate control on a user interface of a credential application. In some implementations, the witness may indicate approval simply by authenticating or providing evidence that the witness was present to observe the entry of the first user's biometric data. The second user inputs biometric data to the electronic device 204, and the electronic device 204 provides the biometric data to the computing system 210 (958). The electronic device 204 generates location data indicating the location of the electronic device 204 and provides the location data to the computing system 210 (959).

The computing system 210 may use the biometric data to verify the identity of the witness (960). Biometric data of the witness may be required to reduce the likelihood that an imposter pretends to be the second user and falsely approves the entry of data used for authentication of the first user. To verify the second user's identity, the computing system 210 may access biometric data that was enrolled for a user profile of the second user, and compare the received biometric data with the enrolled biometric data. If the characteristics of the two sets of biometric data are similar within a predetermined threshold, the two sets of biometric data can be considered to match, and the second user's identity claim can be accepted.

The computing system 210 determines that the authentication conditions are satisfied (961). In the illustrated example, the computing system 210 determines, based on the location data from the electronic devices 202, 204, that the second user's electronic device 204 is within a threshold distance of the electronic device 202. Thus it may be inferred that the user of the electronic device 202 is physically present and capable of observing the entry of the first user's biometric data. Because the biometric data received from the electronic device 204 matches the enrolled biometric data for the second user, it can be inferred that the second user is the person present at the electronic device 204. Finally, the computing system 210 can determine that the second user is authorized to serve as a witness, for example, based on accessing credential data indicating the second user's credentials.

In response to determining that the authentication conditions are satisfied, the computing system 210 performs the action requested by the first user. For example, the computing system 210 provides the credential requested by the first user (962). The computing system 210 may transfer, activate, renew, or permit use of the credential, or perform another action indicated in the request from the first user. The computing system 210 may provide data to the electronic device 202 that enables the electronic device 202 generate and output a code that is able to access one or more secured resources. For example, the information may permit the electronic device 202 to provide a QR code, an animation, a sonic or ultrasonic code, NFC data, or other output that opens an electronic lock or otherwise allows access to resources for which access is limited.

The computing system 210 may store data activating the first user's credential (963). For example, the computing system 210 may store credential data indicating that the credential is valid. When the first user attempts to use the credential, the computing system 210 may access the credential data, determine that the first user's credential is active, and may provide access based on the credential.

The computing system 210 may also store information indicating conditions that cause the credential to become deactivated or unusable. For example, the credential may expire at a particular time or after a particular amount of time has elapsed. As another example, the credential may expire if the electronic device 202 leaves a particular geographical area. Other conditions for causing the credential of a user to expire may additionally or alternatively be set.

If the computing system 210 determines that one or more authentication conditions are not satisfied, then the actions requested by the first user, such as providing a credential and storing data activating the credential, are not performed. The computing system 210 may send data indicating that authentication was unsuccessful, and may indicate the reason enrollment was unsuccessful. Authentication may fail, for example, if the first user's biometric data does not match enrolled biometric data for the first user, if the witness's biometric data does not match enrolled biometric data for the witness, if the electronic device 204 is not within a predetermined threshold distance of the electronic device 202, or for various other reasons.

In some implementations, the electronic devices 202, 204 may provide the computing system 210 with timestamps or other indications of the times that biometric data or location data is generated. The computing system 210 may determine, for example, that the times the locations are detected correspond to the times the biometric data is entered. For example, a location generated minutes before biometric data is entered may not accurately reflect the actual location where the data entry took place. A location may be likely to accurately represent the location where entry of biometric data occurred if the location is measured within a threshold time period, such as 30 seconds, 10 seconds, or 5 seconds, of entry of the biometric data.

In some implementations, the electronic devices 202, 204 are owned by or are otherwise associated with the first user and the second user. For example, the electronic device 202 may be the phone of the first user, and the electronic device 204 may be the phone of the second user. In some implementations, the electronic devices 202, 204 are not owned by or associated with the first user and second user. In some implementations, actions performed by the electronic devices 202, 204 may be performed by a single device, such as a single phone, computer system, or kiosk, or may be performed by more than two devices. For example, the first user and the second user may both use a kiosk in a fixed location, or a computer system in an office, rather than use two different electronic devices 202, 204 to enter biometric data and perform the other actions shown in FIG. 25.

In some implementations, one or more devices may be used to act as witness to verify authentication, in addition to or instead of a human witness. For example, instead of a human witness, a monitoring device may observe the entry of data by the first user and provide data that the computing system 210 may use to determine whether proper authentication procedures were followed by the first user. The monitoring device may be in a fixed location or may be mobile. The monitoring device may be one that has been designated as trusted by the computing system 210, and the monitoring device may provide data to the computing system 210 in a secure manner. Examples of devices that may be used as monitoring devices for witnessing an enrollment include a computer system, a kiosk, a camera, a wall panel, and other devices having sensors or input mechanisms.

In some implementations, in step (956), rather than identifying a human witness, the computing system 210 can identify one or more suitable monitoring devices near the first user. The identified device may be, for example, trusted by the computing system 210 and capable of detecting the appropriate conditions or parameters needed for a proper authentication. The monitoring device may interact with the first user's electronic device 202 just as an electronic device 204 of another user would in the manner described above. In step (957), the computing system 210 may send a request or instruction causing the identified monitoring device to detect the needed parameters, such as video, audio, movement, etc. When the monitoring device is trusted by the computing system 210, steps (958) and (960) may be omitted, since the trusted status of a monitoring device may make further confirmation of the identity of the device unnecessary. Alternatively, in step (958) the monitoring device may provide an identifier, code, key, or other verification data that confirms the identity of the device or that the data from the device can be trusted, and this data may be checked for authenticity against stored data by the computing system 210 in step (960).

At any time, the computing system 210 may request verification data from the monitoring device to verify the identity or trusted status of the monitoring device, or to establish that monitoring data received by the computing system 210 has not been falsified or provided from an unauthorized source. In step (959), the monitoring device may provide the location of the monitoring device to the computing system 210, or the computing system 210 may access data from another source that indicates the location of the monitoring device. For example, if the monitoring device is in a fixed location, the computing system 210 may access previously stored data indicating the location of the monitoring device. At any time during the authentication process, the monitoring device may send data that the computing system 210 can use to verify whether appropriate enrollment conditions are met. For example, the monitoring device may send image or video data, and the computing system 210 may use face recognition or other techniques to verify that an image from the monitoring device shows the same face as the one submitted by the first user using the electronic device 202.

Figure 26:
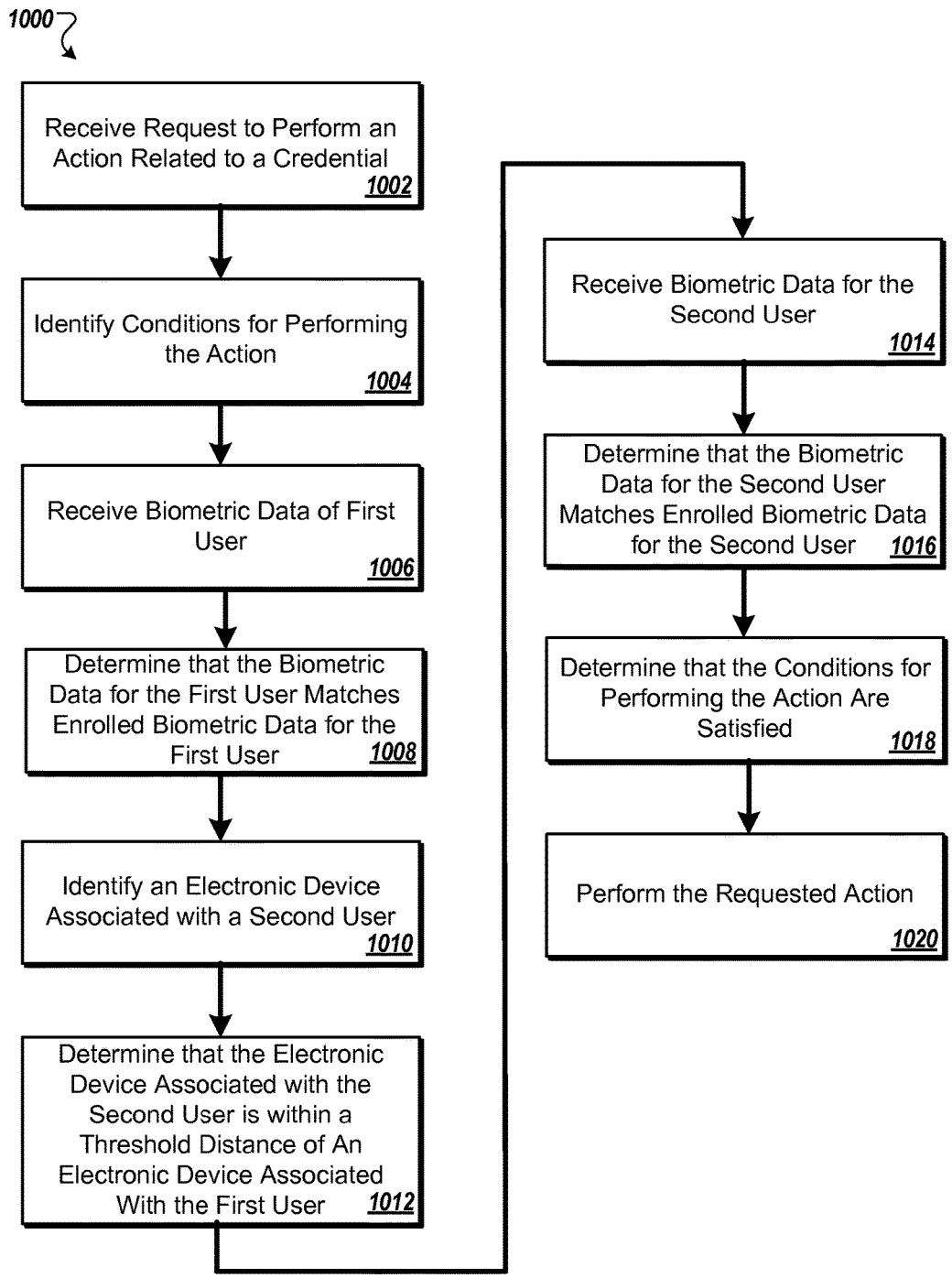
FIG. 26 is a flow diagram of an example of user authentication.

FIG. 26 illustrates an example of a process 1000 for performing an action related to a credential. The process 1000 is described as being performed by the computing system 210, but may additionally or alternatively be performed by another computing system or combination of computing systems.

The computing system 210 receives a request to perform an action related to a credential of a first user (1002). The requested action may be one that requires authentication of the first user, for example, biometric authentication. For example, a first user may access a credential application at an electronic device and request to activate or obtain a credential, transfer a credential to a device, use a credential, or perform another action.

The computing system 210 identifies one or more conditions for performing the action (1004). The one or more conditions may include a requirement that authentication occur while a witness is located within a threshold distance of the first user during entry of biometric data that the first user. Additional conditions, or different conditions, may be used. For example, a condition may require a witness to possess a particular credential. As another example, a condition may require biometric data to be entered at a particular geographical location, such as a particular building, floor, or room, or within a particular range of time. As another example, a condition may require biometric data to be entered at a particular device, such as at a kiosk in one of various locations, or at a particular type of device, such as a device having certain hardware capabilities or running certain software. As another example, a condition may require biometric data to be entered under observation of monitoring equipment, such as a video camera.

The computing system 210 receives biometric data representing one or more biometric identifiers of the first user (1006). The biometric data of the first user may be received from a first electronic device associated with the first user. For example, the first electronic device may detect the biometric input, e.g., by recording speech, capturing an image with a camera, reading a fingerprint, etc., and may provide the biometric input or data extracted from the biometric input to the computing system 210 over a network. The first biometric data may include any appropriate biometric identifier for the first user, and may include biometric identifiers of multiple different types. For example, the biometric data of the first user may include one or more of face image data, eye vein data, iris data, retina data, speech data, fingerprint data, handwriting data, or movement data.

The computing system 210 determines that the biometric data of the first user matches biometric data enrolled for a user account of the first user (1008). For example, the computing system 210 accesses stored biometric data that was previous enrolled for the user account of the first user. The computing system 210 may evaluate the received biometric data for the second user against the stored biometric data enrolled for the user account of the first user. The evaluation may indicate, for example, that a degree of similarity between the received biometric data and the stored biometric data is within a threshold level, and thus that the received biometric data matches the stored biometric data.

The computing system 210 identifies a second electronic device associated with a second user that is to serve as the witness of entry of biometric data that the first user entered (1010). In some implementations, the computing system 210 receives input from the first electronic device or second electronic device that identifies the second user. For example, the second user may indicate, through an application on the second electronic device that is in communication with the computing system 210, that the second user will serve as the witness. As another example, the first user may enter the name of the second user at the first electronic device, and the first electronic device may send the name to the computing system 210.

The computing system 210 determines that the second electronic device is within the threshold distance of the first electronic device (1012). The computing system 210 receives location data indicating the locations of the first electronic device and the second electronic device. The location data may include, for example, one or more of GPS coordinates, data indicating communication with location beacons, data indicating direct communication of the first and second electronic devices through a short-range communication channel, or other data. For example, the computing system 210 may use location data to determine a distance between the first electronic device and the second electronic device, and then compare the distance to the threshold distance. As another example, the location data may indicate that the first electronic device and the second electronic device received a beacon message from the same location beacon, and thus that the electronic device are both within certain distance thresholds of the location beacon. Since the electronic devices are within a known distance of the location beacon, the computing system 210 may determine that the electronic devices are within the threshold distance of each other.

In some implementations, the computing system 210 identifies the second user as a witness based on location data. For example, the computing system 210 may identify one or more electronic devices that are in communication with the computing system 210. From this set of devices, the computing system 210 may determine which devices are associated with a user authorized to be a witness, e.g., by being registered with a user account of a potential witness or having a potential witness logged in at the device. From the subset associated with a user authorized as a witness, which are also within a particular distance threshold from the first electronic device, the computing system 210 may select, for example, the closest electronic device to the first electronic device or may select multiple electronic devices. The users of the selected device or devices may then be witnesses or may be asked to serve as witnesses. Thus, the second user may be identified without user input from the first user or second user specifying which user will be the witness.

The computing system 210 receives biometric data representing one or more biometric identifiers of the second user (1014). In some implementations, the computing system 210 sends a message to the second electronic device requesting biometric data of the second user, and the biometric data of the second user is received in response. The second biometric data may be received from the second electronic device associated with the second user. For example, the second electronic device may detect the biometric input, e.g., by recording speech, capturing an image with a camera, reading a fingerprint, etc., and may provide the biometric input or data extracted from the biometric input to the computing system 210 over a network. The second biometric data may include any appropriate biometric identifier for the second user, and may include biometric identifiers of multiple different types. For example, the second biometric data may include one or more of face image data, eye vein data, iris data, retina data, speech data, fingerprint data, handwriting data, or movement data. The second biometric input may include a biometric identifier for each of multiple different biometric identification modalities, to permit multi-factor biometric authentication of the second user.

The computing system 210 determines that the biometric data of the second user matches biometric data enrolled for a user account of the second user (1016). For example, the computing system 210 accesses stored biometric data that was previous enrolled for the user account of the second user. The computing system 210 may evaluate the received biometric data for the second user against the stored biometric data enrolled for the user account of the second user. The evaluation may indicate, for example, that a degree of similarity between the received biometric data and the stored biometric data is within a threshold level, and thus that the received biometric data matches the stored biometric data.

The computing system 210 determines that the one or more conditions for performing the requested action are satisfied (1018). For example, the determination may be made based on determining that the second electronic device is within a threshold distance of the first electronic device, determining that the biometric data for the first user matches the biometric data enrolled for a user account of the first user, and determining that the biometric data for the second user matches biometric data enrolled for a user account of the second user.

In response to determining that the one or more conditions are satisfied, the computing system 210 performs the requested action (1020). For example, the computing system 210 may store credential data that enables the first user to use the credential. The credential may be renewed and made active until the end of a particular period of time, or until another expiration condition is satisfied. As another example, if the first user attempted to use his credential to gain access to a resource, the computing system 210 may provide access to the resource. In some implementations, the computing system 210 may send data to the electronic device of the first that permits the electronic device to generate a code, such as a QR code, that can provide access to a resource secured by an access control device.

The computing system 210 may identify expiration conditions that cause the first user's credential to become disabled. For example, the computing system 210 may access credential data that the credential expires after a predetermined time, determining that a current time is after the predetermined time, and disable the credential in response to determining that the current time is after the predetermined time. As another example, the computing system 210 may access credential data indicating that the credential expires if the first user leaves a predetermined geographical region. The computing system 210 may receive data indicating a location of the first electronic device, determine that the location of the first electronic device is outside the predetermined geographical region, and disable the credential in response to determining that the location of the first electronic device is outside the predetermined geographical region.

In some implementations, an electronic device, such as a phone, may include sensors that track motion of the electronic device. Patterns of motion of the device may indicate how the electronic device is typically used or carried. For example, a phone carried by a user may detect motion that is indicative of the gait of the owner, or the typical speed or frequency at which the user moves. The patterns of motion may be analyzed to determine a motion signature that indicates how the electronic device typically moves under normal circumstances. This motion signature, or other motion data, may be enrolled in a user account for a user. Motion patterns that differ from the typical motion patterns may indicate, for example, that a user other than the owner is carrying the electronic device, or that the device is being used in an unusual manner. In some implementations, a credential that is active on an electronic device may be disabled if motion of the electronic device differs from the typical motion of the device. For example, the computing system 210 may access credential data indicating that the credential expires if motion of the first electronic device differs from motion represented by motion data associated with the user account of the first user. The computing system 210 may receive motion data indicating motion of the first electronic device, access stored motion data associated with the user account of the first user, and evaluate the received motion data against the stored motion data. The computing system 210 may determine, based on the evaluation, that the motion indicated by the received motion data is different from the motion indicated by the stored motion data, and may disable the credential in response.

In some implementations, if the computing system 210 determines that the one or more conditions are not satisfied, the requested action is not performed. The computing system 210 may provide data to the electronic device of the first user, or to another device, indicating that the action was not performed. The computing system 210 may provide data indicating the reason that the action was not performed, e.g., by identifying the condition that was not satisfied. As an example, if the second user's biometric data does not match the stored biometric data enrolled for the user account of the second user, or if the first user's biometric data does not match the stored biometric data enrolled for the user account of the first user, the requested action will not be performed. As additional examples, the requested action may not be performed if a user who attempts to serve as a witness lacks a required credential, or if the electronic device of a witness is located at a distance greater than the threshold distance from the first electronic device.

In some implementations, the witness may be required to provide input confirming that the second user witnessed the first user entering the first biometric data before the action is performed. The computing system may transmit a request for confirmation to the second electronic device and then receive confirmation data indicating user input confirming that the second user witnessed the first user entering biometric identifiers in response to the request. The confirmation data may be used to determine whether the conditions for performing the action are satisfied.

The one or more conditions may include a condition that entry of the biometric data must occur within a predetermined geographical region. The computing system may receive location data indicating a location of the first electronic device, and determine, based on the location data, that the first electronic device is located within the predetermined geographical region to determine whether the condition is satisfied.

In some implementations, the one or more conditions indicate that the witness must possess a particular credential. The computing system 210 may access credential data indicating credentials associated with a user account of the second user, and determine based on the credential data that the second user possesses the particular credential required to be a witness.

In some implementations, the computing system 210 the one or more conditions indicate that authentication by the witness must occur within a predetermined period of time of capture of the biometric data of the first user. The predetermined period of time may be a range of time before entry of the first user's biometric data, after the first user's biometric data, or extending before and after entry of the first user's biometric data. The computing system 210 may determine a first time that the biometric data of the first user was captured, determine a second time that the biometric data of the second user was captured, determine a period of time between the first time and the second time, and determine that the period of time is within the predetermined period of time.

In some implementations, the location data is required to represent locations detected within a predetermined period of time of the input of biometric data. For example, the computing system 210 may receive data indicating a time that biometric data was detected and receive data indicating a time that location data for the first and second electronic devices was generated. The computing system 210 may determine a period of time between the time that the biometric data was detected and a time that the location data was generated, and determine that the period of time satisfies a threshold. Determining that the one or more conditions are satisfied can include determining that the period of time satisfies the threshold.

As discussed above, in some implementations, a device is used to monitor entry of biometric input for enrollment or authentication, in addition to or instead of a human witness. The computing system 210 can receive monitoring data associated with the entry of biometric input of a user enrolling or authenticating, or monitoring data associated with the entry of biometric data of a witness. The monitoring data can indicate information detected by a monitoring device during entry of biometric input, and in some implementations, an amount of time before and/or after entry of the biometric input. The monitoring device may be a trusted device, such as a kiosk, wall panel, security camera, etc. that has been designated as a device that should be trusted by the computing system 210. Alternatively, the monitoring device may be another device, such as a mobile phone of a different user or other electronic device that may or may not be designated as trusted. The computing system 210 may receive an identifier of the monitoring device or other information about the monitoring device, access data that indicates a set of trusted devices, and determine whether a monitoring device is trusted, and thus whether or not data from the monitoring device will be used to determine if conditions for performing various actions are satisfied.

When monitoring data is received, the computing system 210 may evaluate the monitoring data to determine whether conditions for performing an action are satisfied. For example, conditions for enrollment, authentication, or other action may require that, for biometric data to be accepted from a first electronic device, such as the user's phone, a separate monitoring device must detect parameters that corroborate the validity of the biometric input received from the first electronic device. For example, if a user submits a face image from his phone, the computing system 210 may compare the face image with a face image recorded by a security camera, kiosk, or other trusted device, and determine whether the two face images match. If the two face images match, for example, within a threshold level of similarity, the monitoring condition may be considered to be satisfied. If the two face images do not match, the biometric input may be rejected and the user's requested action may be denied. As another example, when the first electronic device submits audio data, the computing system 210 may compare the audio data with audio data recorded at the same time by a second electronic device, to determine if audio characteristics of the two recordings match.

Accordingly, the computing system 210 can determine, based on comparing received biometric data with the monitoring data, whether the one or more biometric identifiers represented by the biometric data match the one or more biometric identifiers represented by the monitoring data. For example, the computing system 210 may determine whether voice characteristics or face characteristics indicated by the audio data or image data from the first electronic device match voice characteristics or face characteristics indicated by the audio data or image data detected by the second electronic device.

Figure 27:
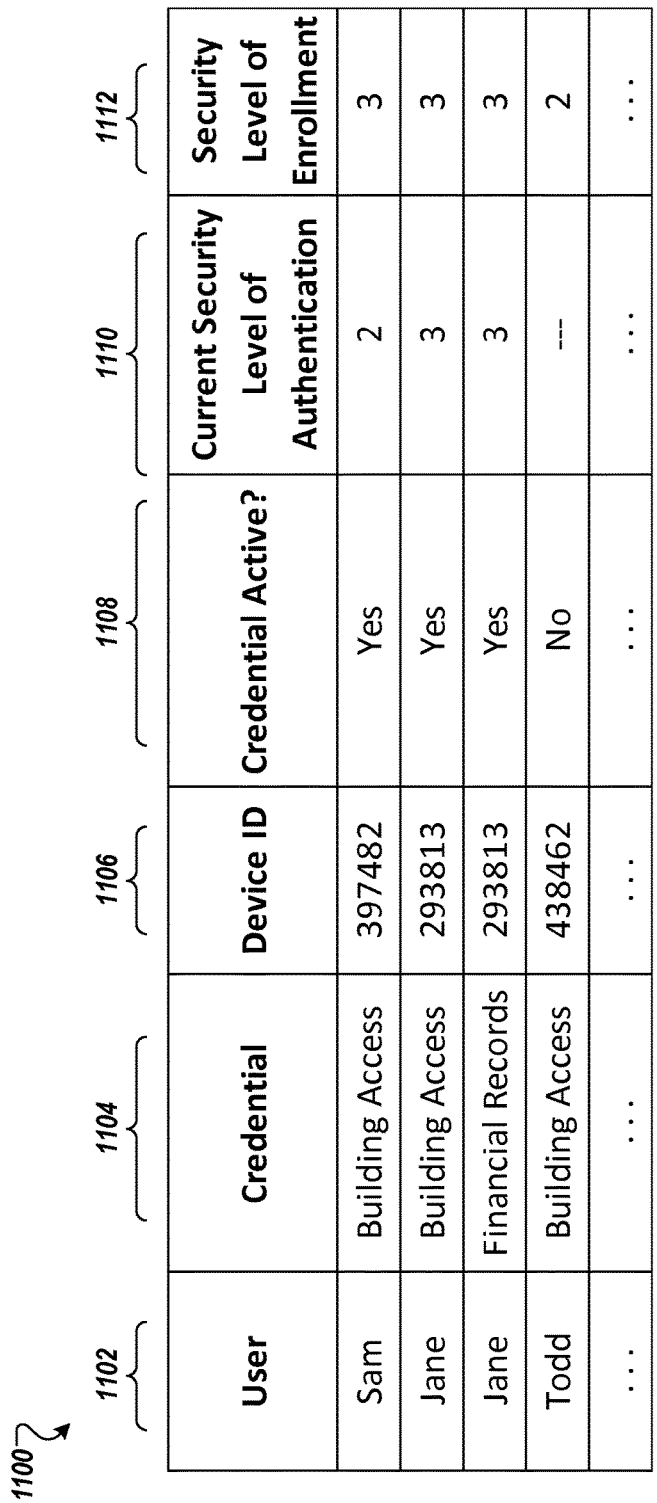
FIG. 27 is a table of examples of credential data.

FIG. 27 illustrates an example of a table 1100 including credential data. The table 1100 includes user identifiers 1102 for enrolled users, credential identifiers 1104 for the credentials of the users, and device identifiers 1106 for devices associated with the users. The table 1100 also includes status data 1108 indicating whether the credential is active (e.g., enabled to allow use or disabled to disallow use), and security level data 1110 indicating the level of security to which users have been authenticated. The table 1100 includes enrollment security level data 1112 indicating the security or trust level of enrolled biometric data for the user account of a user.

When a user authenticates according to required authentication conditions, the computing system 210 may change the status data 1108 for the user's credential to indicate that the credential have is available for use. When an expiration condition occurs, the computing system 210 may update the status data 1108 to indicate that the credential has been disabled.

When a user uses a device to attempt to gain access to a secured resource, the computing system 210 may use data in the table 1100 to determine whether or not access should be provided. For example, the computing system 210 may evaluate the credential identifiers 1104 to determine whether the user possesses the appropriate credential required for access. The computing system 210 also evaluates the credential data to determine whether the credential is active for the user and the user's device, e.g., whether the user has recently authenticated using the device. If the user possesses the appropriate credential, and the credential is active on the user's device, access may be granted. If the user does not have the appropriate credential, or if the credential is not active, access may be denied.

In some implementations, credentials may be activated on certain devices associated with a user, but not all devices associated with a user. For example, if Sam authenticates using Sam's phone but not with Sam's tablet computer, it is possible that someone else has possession of the tablet computer. In this instance, the credential may be enabled for use at the phone, but not at the tablet computer unless Sam authenticates using the tablet computer.

In some implementations, different resources may require different levels of authentication. Authentication under a first set of conditions may allow certain access privileges, and authentication under a second set of conditions may allow different or enhanced access privileges. The computing system 210 may evaluate the security level of a user's authentication, as indicated by the security level data 1110, to determine whether the user has authenticated in a manner that is secure enough to permit access. As an example, even a user's credential authorizes access to an entire building, authenticating with a first security level of may permit access to only a certain portion of the building. A higher security level of authentication may be required for full use of the credential.

In some implementations, the security level of authentication is limited by a security level of enrolled data for a user. For example, if the enrolled data is only trusted to security level "2," authentication of the user using that enrolled data may only be trusted to security level "2."

In some implementations, authenticating at a security level higher than the security level of enrolled data may allow the security level of the enrolled data to be upgraded. For example, a user's enrolled biometric data may have been entered without a witness and thus is only trusted to security level "1." After the user authenticates successfully under the conditions corresponding to authentication security level "3," however, the security level to which the enrolled data is trusted may be increased to security level "3." Since the user has authenticated under controlled conditions, for example, in which a witness may verify the user's identity, and the biometric data provided at authentication. In effect, the authentication may serve as a confirmation or re-enrollment of the user's biometric data.

FIG. 28 illustrates an example of a table 1130 indicating authentication conditions and access privileges corresponding to different security levels. The table includes security level data 1132, privilege data 1143 indicating the areas of a building that are accessible with the corresponding security level, and authentication condition data 1136 indicating the conditions that must be met to achieve the associated security level. For example, to authenticate at security level "1," a user must complete biometric authentication with a single type of biometric input. This security level allows access to only the first floor of the building. The other security levels provide greater access, and also require authentication under more controlled conditions.

Figure 29:
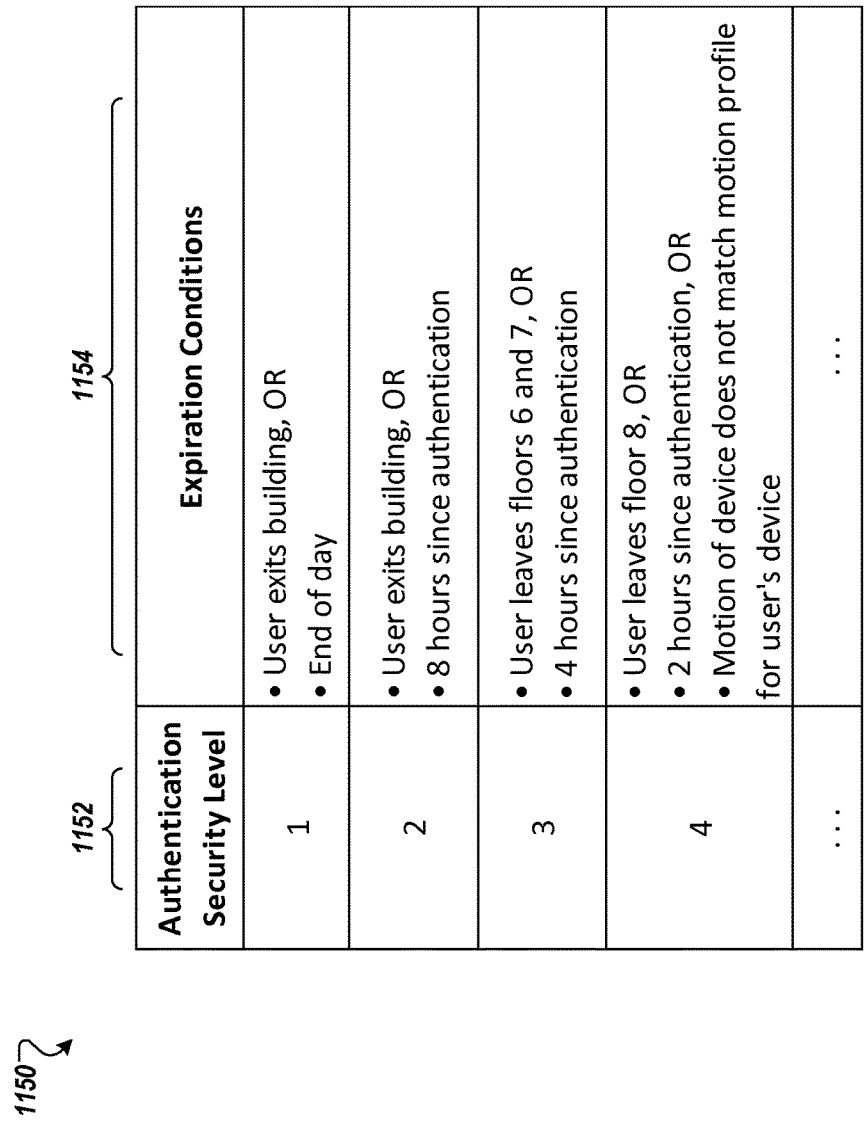
FIG. 29 is a table of examples of credential expiration conditions.

FIG. 29 illustrates an example of a table 1150 indicating expiration conditions corresponding to different security levels. Different levels of authentication may have different corresponding expiration conditions. The table 1150 includes security level identifiers 1152 and expiration condition data 1154 indicating expiration conditions for each security level. Once the computing system 210 determines that an expiration condition has occurred, the computing system 210 may disable the credential or disallow use of the credential until the user authenticates again.

In some implementations, meeting the expiration condition associated with a security level may cause the credential to be unavailable, e.g., disabled or deactivated. In some implementations, occurrence of an expiration condition may cause the security level of a credential to be downgraded. For example, two hours after authentication with a security level of "4," the security level may be downgraded to security level "3," rather than being disabled entirely. After four hours since authentication, the security level may be downgraded from "3" to "2," and so on.

Figure 30:
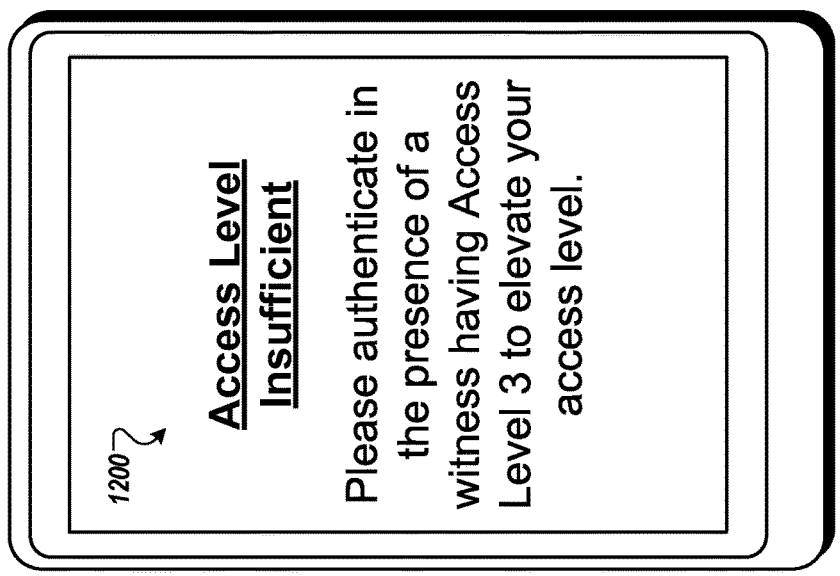

FIG. 30 illustrates an example of a user interface 1200 for indicating that an access privilege or level of authorization is insufficient. In the example, a user attempted to gain access to a location or resource without the proper level of authentication. Because the security level of authentication did not meet the required level, access was denied. The user interface 1200 notifies the user that certain conditions must be met to obtain the required authentication security level, such as the presence of a witness authenticated to "Access Level 3."

Figure 31:
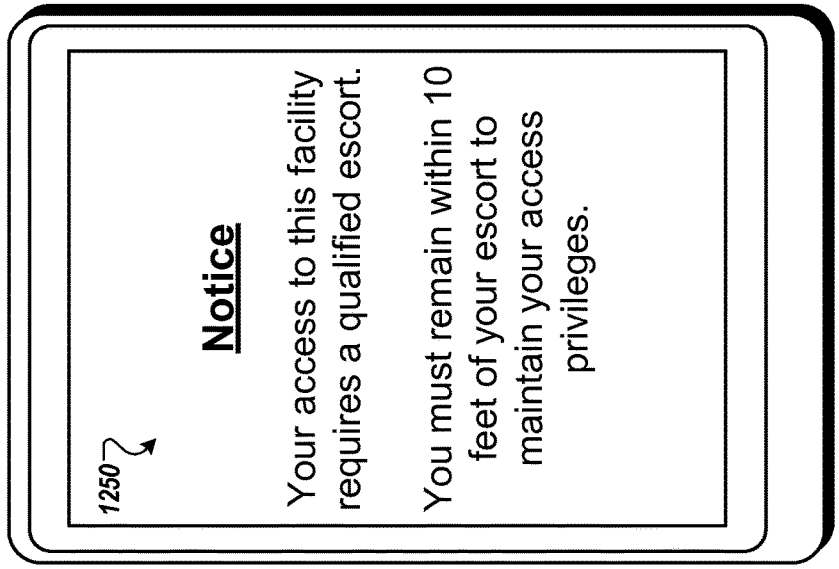
FIGS. 30 and 31 are examples of user interfaces of a credential management application.

FIG. 31 illustrates an example of a user interface 1250 providing a notice indicating conditions for access. In the example, a user has gained access to a facility, but requires an escort with higher access privileges to maintain access. The user's access privileges will expire if the user is located more than a threshold distance from the escort. The user's electronic device, e.g., the user's phone, and an electronic device for the escort, e.g., the escort's phone, may both be in communication with the computing system 210 to indicate their respective locations. If the computing system 210 determines that the user's electronic device is more than the threshold distance from the escort's electronic device, the computing system 210 may terminate the access privileges of the user. In some implementations, access may be disallowed until the user returns to within the threshold distance of the escort. In some implementations, being outside the threshold distance may revoke access privileges and returning to proximity of the escort will not restore access privileges.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touch-screen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A system comprising: at least one processor; and at least one computer-readable medium coupled to the at least one processor having stored thereon instructions which, when executed by the at least one processor, cause the at least one processor to perform operations comprising: receiving a request to perform an action associated with a user account of a user; identifying one or more conditions for performing the action, the one or more conditions specifying entry of biometric input within a designated area; receiving, from a first electronic device associated with the user, biometric data representing one or more biometric identifiers from biometric input of the user; receiving monitoring data indicating information detected by a second electronic device that is located within the designated area, wherein the monitoring data indicates information detected by the second electronic device during entry of the biometric input to the first electronic device, the monitoring data indicating characteristics of a physical environment of the second electronic device other than a distance between the second electronic device and the first electronic device, wherein the monitoring data indicates one or more biometric identifiers detected in the physical environment; determining that the second electronic device is designated as a trusted device for monitoring entry of biometric data; comparing the biometric data with the monitoring data; determining, based on comparing the biometric data with the monitoring data, that the one or more biometric identifiers represented by the biometric data match the one or more biometric identifiers represented by the monitoring data; determining that the second electronic device is within a threshold distance of the first electronic device when the biometric input of the user is entered to the first electronic device associated with the user; determining that the one or more conditions are satisfied based on (i) determining that the second electronic device is within a threshold distance of the first electronic device when the biometric input of the user is entered to the first electronic device associated with the user, (ii) determining that the one or more biometric identifiers represented by the biometric data match the one or more biometric identifiers represented by the monitoring data, (iii) determining that the second electronic device is designated as a trusted device for monitoring entry of biometric data; and in response to determining that the one or more conditions are satisfied, performing the requested action associated with the user account of the user.

2. The system of claim 1, wherein receiving a request to perform the action associated with the user account of the user comprises receiving a request to perform an action related to a credential, the action requiring biometric authentication of the user; wherein the operations further comprise determining that the received biometric data for the user matches stored biometric data enrolled for a user account of the user; and wherein determining that the one or more conditions are satisfied comprises determining that the one or more conditions are satisfied is further based on determining that the received biometric data for the user matches the stored biometric data enrolled for the user account of the user.

3. The system of claim 2, wherein determining that the received biometric data for the user matches the stored biometric data enrolled for a user account of the user comprises: accessing stored biometric data enrolled for the user account of the user, the stored biometric data representing one or more stored biometric identifiers of the user; evaluating the received biometric data for the user against the stored biometric data enrolled for the user account of the user; and determining, based on evaluating the received biometric data for the user against the stored biometric data enrolled for the user account of the user, that the received biometric data for the user matches the stored biometric data enrolled for the user account of the user.

4. The system of claim 2, wherein receiving the request to perform the action related to a credential that requires biometric authentication of the user comprises receiving a request to activate or issue a credential of the user; and wherein performing the action indicated by the request comprises activating or issuing the credential of the user.

5. The system of claim 4, wherein the operations further comprise: accessing credential data indicating that the credential expires if the user leaves a predetermined geographical region; receiving data indicating a location of the first electronic device; determining that the location of the first electronic device is outside the predetermined geographical region; and in response to determining that the location of the first electronic device is outside the predetermined geographical region, disabling the credential.

6. The system of claim 1, wherein the operations further comprise, after a credential associated with the user account has been issued or activated: accessing credential data indicating that the credential expires if motion of the first electronic device differs from motion represented by motion data associated with the user account of the user; receiving motion data indicating motion of the first electronic device; accessing stored motion data associated with the user account of the user; evaluating the received motion data against the stored motion data; determining, based on evaluating the received motion data against the stored motion data, that the motion indicated by the received motion data is different from the motion indicated by the stored motion data; and in response to determining, based on evaluating the received motion data against the stored motion data, that the motion indicated by the received motion data is different from the motion indicated by the stored motion data, disabling the credential.

7. The system of claim 1, wherein receiving the request to perform an action comprises receiving, from the first electronic device, a request to make a credential of the user active on the first electronic device, wherein biometric authentication of the user is required to make the credential active; and wherein performing the action indicated by the request comprises making the credential of the user active on the first electronic device.

8. The system of claim 1, wherein the user is a first user, and wherein the operations further comprise: transmitting, to the second electronic device, data requesting that a second user confirm that the second user witnessed the first user entering the biometric input; and receiving data indicating user input confirming that the second user witnessed the first user entering the biometric input; and verifying biometric data that the second user input to the second electronic device after transmission of the data requesting that the second user witnessed the first user entering the biometric input; wherein determining that the one or more conditions are satisfied is further based on (i) receiving data indicating user input confirming that the second user witnessed the first user entering the biometric input, and (ii) verifying biometric data that the second user input to the second electronic device after transmission of the data requesting that the second user witnessed the first user entering the biometric input.

9. The system of claim 1, wherein receiving biometric data for the user comprises receiving biometric data that includes a first biometric identifier for a first modality, and receiving a second biometric identifier for a second modality that is different from the first modality.

10. The system of claim 1, wherein receiving, from the second electronic device, biometric data for the user comprises receiving data representing one or more of a face image data, eye vein data, iris data, retina data, speech data, fingerprint data, handwriting data, or movement data.

11. The system of claim 1, wherein the operations further comprise receiving, from the first electronic device, interaction data indicating that the first electronic device wirelessly received a location beacon message that is transmitted by a transmitter device within a limited area, the transmitter device being in a fixed location; and wherein determining that the second electronic device is within a threshold distance of the first electronic device comprises determining that the second electronic device is within a threshold distance of the first electronic device based on the interaction data.

12. The system of claim 1, wherein the first electronic device is a mobile phone of the user, and the second electronic device is a mobile phone of another user.

13. The system of claim 1, wherein comparing the biometric data with the monitoring data comprises comparing audio data or image data from the first electronic device with audio data or image data detected by the second electronic device; and wherein determining, based on comparing the biometric data with the monitoring data, that the one or more biometric identifiers represented by the biometric data match the one or more biometric identifiers represented by the monitoring data comprises determining that voice characteristics or face characteristics indicated by the audio data or image data from the first electronic device match voice characteristics or face characteristics indicated by the audio data or image data detected by the second electronic device.

14. The system of claim 1, wherein receiving the request to perform the action associated with the user account of the user comprises receiving a request to enroll biometric data of the user with the user account of the user; and wherein performing the requested action associated with the user account of the user comprises storing, in electronic storage, account data that enrolls the biometric data for the user account of the user.

15. The system of claim 1, wherein the monitoring data comprises image data, video data, audio data, or movement data captured by the second electronic device during entry of the biometric input to the first electronic device.

16. At least one non-transitory computer-readable storage medium encoded with executable instructions that, when executed by at least one processor, cause the at least one processor to perform operations comprising: receiving a request to perform an action associated with a user account of a user; identifying one or more conditions for performing the action, the one or more conditions specifying entry of biometric input within a designated area; receiving, from a first electronic device associated with the user, biometric data representing one or more biometric identifiers from biometric input of the user; receiving monitoring data indicating information detected by a second electronic device that is located within the designated area, wherein the monitoring data indicates information detected by the second electronic device during entry of the biometric input to the first electronic device, the monitoring data indicating characteristics of a physical environment of the second electronic device other than a distance between the second electronic device and the first electronic device, wherein the monitoring data indicates one or more biometric identifiers detected in the physical environment; determining that the second electronic device is designated as a trusted device for monitoring entry of biometric data; comparing the biometric data with the monitoring data; determining, based on comparing the biometric data with the monitoring data, that the one or more biometric identifiers represented by the biometric data match the one or more biometric identifiers represented by the monitoring data; determining that the second electronic device is within a threshold distance of the first electronic device when the biometric input of the user is entered to the first electronic device associated with the user; determining that the one or more conditions are satisfied based on (i) determining that the second electronic device is within a threshold distance of the first electronic device when the biometric input of the user is entered to the first electronic device associated with the user, (ii) determining that the one or more biometric identifiers represented by the biometric data match the one or more biometric identifiers represented by the monitoring data, and (iii) determining that the second electronic device is designated as a trusted device for monitoring entry of biometric data; and in response to determining that the one or more conditions are satisfied, performing the requested action associated with the user account of the user.

17. The at least one non-transitory computer-readable storage medium of claim 16, wherein the operations further comprise determining that the second electronic device is designated as a trusted device for monitoring entry of biometric data; wherein determining that the one or more conditions are satisfied is further based on determining that the second electronic device is designated as a trusted device for monitoring entry of biometric data.

18. A method performed by one or more computing devices, the method comprising: receiving a request to perform an action associated with a user account of a user; identifying one or more conditions for performing the action, the one or more conditions specifying entry of biometric input within a designated area; receiving, from a first electronic device associated with the user, biometric data representing one or more biometric identifiers from biometric input of the user; receiving monitoring data detected by a second electronic device that is located within the designated area, wherein the monitoring data indicates information detected by the second electronic device during entry of the biometric input to the first electronic device, the monitoring data indicating characteristics of a physical environment of the second electronic device other than a distance between the second electronic device and the first electronic device, wherein the monitoring data indicates one or more biometric identifiers detected in the physical environment; determining that the second electronic device is designated as a trusted device for monitoring entry of biometric data; comparing the biometric data with the monitoring data; determining, based on comparing the biometric data with the monitoring data, that the one or more biometric identifiers represented by the biometric data match the one or more biometric identifiers represented by the monitoring data; determining that the second electronic device is within a threshold distance of the first electronic device when the biometric input of the user is entered to the first electronic device associated with the user; determining that the one or more conditions are satisfied based on (i) determining that the second electronic device is within a threshold distance of the first electronic device when the biometric input of the user is entered to the first electronic device associated with the user, (ii) determining that the one or more biometric identifiers represented by the biometric data match the one or more biometric identifiers represented by the monitoring data, and (iii) determining that the second electronic device is designated as a trusted device for monitoring entry of biometric data; and in response to determining that the one or more conditions are satisfied, performing the requested action associated with the user account of the user.

19. The method of claim 18, wherein receiving the request to perform the action associated with the user account of the user comprises receiving a request to enroll biometric data of the user with the user account of the user; and wherein performing the requested action associated with the user account of the user comprises enrolling the biometric data with the user account by designating the biometric data as specifying biometric attributes for an authorized user of the user account.

20. The method of claim 18, wherein the monitoring data comprises image data, video data, audio data, or movement data captured by the second electronic device during entry of the biometric input to the first electronic device.

* * * * *